(12) United States Patent
Dange

(10) Patent No.: US 11,088,985 B2
(45) Date of Patent: *Aug. 10, 2021

(54) CIVIC ISSUES PLATFORMS ON ONLINE SOCIAL NETWORKS

(71) Applicant: Facebook, Inc., Menlo Park, CA (US)

(72) Inventor: Amod Ashok Dange, Mountain View, CA (US)

(73) Assignee: Facebook, Inc., Menlo Park, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/414,699

(22) Filed: May 16, 2019

(65) Prior Publication Data

US 2019/0281006 A1 Sep. 12, 2019

Related U.S. Application Data

(63) Continuation of application No. 14/716,742, filed on May 19, 2015, now Pat. No. 10,298,535.

(51) Int. Cl.
| | |
|---|---|
| *H04L 12/58* | (2006.01) |
| *G06Q 50/00* | (2012.01) |
| *G06Q 10/10* | (2012.01) |
| *G06Q 50/26* | (2012.01) |
| *G06F 16/35* | (2019.01) |
| *G06F 16/2457* | (2019.01) |
| *G06F 16/30* | (2019.01) |

(52) U.S. Cl.
CPC ........ *H04L 51/32* (2013.01); *G06F 16/24578* (2019.01); *G06F 16/30* (2019.01); *G06F 16/35* (2019.01); *G06Q 10/10* (2013.01); *G06Q 50/01* (2013.01); *G06Q 50/26* (2013.01); *H04L 51/20* (2013.01)

(58) Field of Classification Search
CPC ......... H04L 51/32; H04L 51/34; H04L 51/20; G06Q 10/10; G06Q 50/01; G06Q 50/26; G06F 16/35; G06F 16/30; G06F 16/24578

See application file for complete search history.

(56) References Cited

U.S. PATENT DOCUMENTS

| | | | |
|---|---|---|---|
| 5,918,014 | A | 6/1999 | Robinson |
| 6,539,232 | B2 | 3/2003 | Hendrey |
| 6,957,184 | B2 | 10/2005 | Schmid |
| 7,069,308 | B2 | 6/2006 | Abrams |
| 7,379,811 | B2 | 5/2008 | Rasmussen |

(Continued)

*Primary Examiner* — Aaron N Strange
(74) *Attorney, Agent, or Firm* — Baker Botts L.L.P.

(57) ABSTRACT

In one embodiment, a method includes receiving a post corresponding to a civic issue on a civic-issues platform of an online social network associated with a first municipality from a client system of a first user of the online social network, where the first user is connected to the first municipality within the online social network, determining a classification of the post based on a comparison of the post with one or more classification-keywords stored in a public-agency database, assigning the post to a first agency of the first municipality based on the determined classification of the post and a location associated with the civic issue, receiving a request to update the post on the civic-issues platform, the request describing a current status of the civic issue, and updating the post on the civic-issues platform to indicate the current status of the civic issue.

20 Claims, 6 Drawing Sheets

(56) References Cited

U.S. PATENT DOCUMENTS

| | | | |
|---|---|---|---|
| 7,539,697 | B1 | 5/2009 | Akella |
| 7,686,219 | B1 | 3/2010 | Wisilosky |
| 7,752,326 | B2 | 7/2010 | Smit |
| 7,783,630 | B1 | 8/2010 | Chevalier |
| 7,836,044 | B2 | 11/2010 | Kamvar |
| 8,027,990 | B1 | 9/2011 | Mysen |
| 8,060,639 | B2 | 11/2011 | Smit |
| 8,112,529 | B2 | 2/2012 | Van Den Oord |
| 8,180,804 | B1 | 5/2012 | Narayanan |
| 8,185,558 | B1 | 5/2012 | Narayanan |
| 8,239,364 | B2 | 8/2012 | Wable |
| 8,244,848 | B1 | 8/2012 | Narayanan |
| 8,271,471 | B1 | 9/2012 | Kamvar |
| 8,271,546 | B2 | 9/2012 | Gibbs |
| 8,296,298 | B1* | 10/2012 | Redman ............... G06Q 50/26 705/7.17 |
| 8,301,639 | B1 | 10/2012 | Myllymaki |
| 8,306,922 | B1 | 11/2012 | Kunal |
| 8,321,364 | B1 | 11/2012 | Gharpure |
| 8,364,709 | B1 | 1/2013 | Das |
| 8,386,465 | B2 | 2/2013 | Ansari |
| 8,407,200 | B2 | 3/2013 | Wable |
| 8,412,749 | B2 | 4/2013 | Fortuna |
| 8,538,960 | B2 | 9/2013 | Wong |
| 8,572,129 | B1 | 10/2013 | Lee |
| 8,595,297 | B2 | 11/2013 | Marcucci |
| 8,601,027 | B2 | 12/2013 | Behforooz |
| 8,639,725 | B1 | 1/2014 | Udeshi |
| 8,732,208 | B2 | 5/2014 | Lee |
| 8,742,934 | B1* | 6/2014 | Sarpy, Sr. ............. G06Q 50/26 340/573.1 |
| 8,744,911 | B2 | 6/2014 | Rohan |
| 8,751,521 | B2 | 6/2014 | Lee |
| 8,775,324 | B2 | 7/2014 | Zhu |
| 8,782,080 | B2 | 7/2014 | Lee |
| 8,782,753 | B2 | 7/2014 | Lunt |
| 8,788,645 | B2 | 7/2014 | Beringer |
| 8,832,111 | B2 | 9/2014 | Venkataramani |
| 8,868,603 | B2 | 10/2014 | Lee |
| 8,898,226 | B2 | 11/2014 | Tiu |
| 8,909,637 | B2 | 12/2014 | Patterson |
| 8,914,371 | B2 | 12/2014 | Aggarwal |
| 8,914,392 | B2 | 12/2014 | Lunt |
| 8,918,418 | B2 | 12/2014 | Lee |
| 8,924,406 | B2 | 12/2014 | Lunt |
| 8,935,255 | B2 | 1/2015 | Sankar |
| 8,935,261 | B2 | 1/2015 | Pipegrass |
| 8,935,271 | B2 | 1/2015 | Lassen |
| 8,949,232 | B2 | 2/2015 | Harrington |
| 8,949,250 | B1 | 2/2015 | Garg |
| 8,949,261 | B2 | 2/2015 | Lunt |
| 8,954,675 | B2 | 2/2015 | Venkataramani |
| 8,983,975 | B2 | 3/2015 | Kenton |
| 8,983,991 | B2 | 3/2015 | Sankar |
| 9,015,605 | B2 | 4/2015 | Sullivan |
| 9,152,692 | B2* | 10/2015 | Schueppert ........... G06F 16/285 |
| 9,342,976 | B2* | 5/2016 | Pfeffer ................. G08B 25/006 |
| 9,378,295 | B1 | 6/2016 | Marra |
| 9,420,099 | B1* | 8/2016 | Krishnan ............... H04W 4/90 |
| 9,612,996 | B1 | 4/2017 | Vanderwater |
| 9,628,622 | B1* | 4/2017 | Van Loo ............. H04M 3/5133 |
| 9,645,995 | B2 | 5/2017 | Galle |
| 9,703,859 | B2 | 7/2017 | Boucher |
| 2002/0086676 | A1 | 7/2002 | Hendrey |
| 2002/0196273 | A1 | 12/2002 | Krause |
| 2003/0135378 | A1* | 7/2003 | Carlson ................ G06Q 10/10 705/323 |
| 2003/0154194 | A1 | 8/2003 | Jonas |
| 2003/0208474 | A1 | 11/2003 | Soulanille |
| 2004/0088325 | A1 | 5/2004 | Elder |
| 2004/0172237 | A1 | 9/2004 | Saldanha |
| 2004/0215793 | A1 | 10/2004 | Ryan |
| 2004/0255237 | A1 | 12/2004 | Tong |
| 2005/0091202 | A1 | 4/2005 | Thomas |
| 2005/0125408 | A1 | 6/2005 | Somaroo |
| 2005/0131872 | A1 | 6/2005 | Calbucci |
| 2005/0171955 | A1 | 8/2005 | Hull |
| 2005/0256756 | A1 | 11/2005 | Lam |
| 2006/0136419 | A1 | 6/2006 | Brydon |
| 2006/0190436 | A1 | 8/2006 | Richardson |
| 2007/0021973 | A1 | 1/2007 | Stremler |
| 2007/0277100 | A1 | 11/2007 | Sheha |
| 2008/0033926 | A1 | 2/2008 | Matthews |
| 2008/0072180 | A1 | 3/2008 | Chevalier |
| 2008/0104495 | A1 | 5/2008 | Craig |
| 2008/0126417 | A1* | 5/2008 | Mazurik ................. G06F 16/90 |
| 2008/0162260 | A1 | 7/2008 | Rohan |
| 2008/0183694 | A1 | 7/2008 | Cane |
| 2008/0183695 | A1 | 7/2008 | Jadhav |
| 2008/0201156 | A1 | 8/2008 | Abhyanker |
| 2008/0270615 | A1 | 10/2008 | Centola |
| 2009/0006543 | A1 | 1/2009 | Smit |
| 2009/0094200 | A1 | 4/2009 | Baeza-Yates |
| 2009/0164929 | A1 | 6/2009 | Chen |
| 2009/0197681 | A1 | 8/2009 | Krishnamoorthy |
| 2009/0228296 | A1 | 9/2009 | Ismalon |
| 2009/0265326 | A1 | 10/2009 | Lehrman |
| 2009/0276414 | A1 | 11/2009 | Gao |
| 2009/0281988 | A1 | 11/2009 | Yoo |
| 2009/0299963 | A1 | 12/2009 | Pippori |
| 2010/0003958 | A1* | 1/2010 | Ray ....................... G10L 13/043 455/404.2 |
| 2010/0049802 | A1 | 2/2010 | Raman |
| 2010/0057723 | A1 | 3/2010 | Rajaram |
| 2010/0125562 | A1 | 5/2010 | Nair |
| 2010/0179929 | A1 | 7/2010 | Yin |
| 2010/0197318 | A1 | 8/2010 | Petersen |
| 2010/0228744 | A1 | 9/2010 | Craswell |
| 2010/0235354 | A1 | 9/2010 | Gargaro |
| 2010/0321399 | A1 | 12/2010 | Ellren |
| 2011/0010384 | A1 | 1/2011 | Luo |
| 2011/0022602 | A1 | 1/2011 | Luo |
| 2011/0078166 | A1 | 3/2011 | Oliver |
| 2011/0087534 | A1 | 4/2011 | Strebinger |
| 2011/0137902 | A1 | 6/2011 | Wable |
| 2011/0191371 | A1 | 8/2011 | Elliott |
| 2011/0196855 | A1 | 8/2011 | Wable |
| 2011/0217958 | A1* | 9/2011 | Kiesel .................... H04W 4/00 455/414.1 |
| 2011/0231296 | A1 | 9/2011 | Gross |
| 2011/0276396 | A1 | 11/2011 | Rathod |
| 2011/0313992 | A1 | 12/2011 | Groeneveld |
| 2011/0320470 | A1 | 12/2011 | Williams |
| 2012/0059708 | A1 | 3/2012 | Galas |
| 2012/0136852 | A1 | 5/2012 | Geller |
| 2012/0166432 | A1 | 6/2012 | Tseng |
| 2012/0166433 | A1 | 6/2012 | Tseng |
| 2012/0179637 | A1 | 7/2012 | Juan |
| 2012/0185486 | A1 | 7/2012 | Voigt |
| 2012/0209832 | A1 | 8/2012 | Neystadt |
| 2012/0221581 | A1 | 8/2012 | Narayanan |
| 2012/0271831 | A1 | 10/2012 | Narayanan |
| 2012/0278127 | A1 | 11/2012 | Kirakosyan |
| 2012/0284329 | A1 | 11/2012 | Van Den Oord |
| 2012/0290979 | A1 | 11/2012 | Devecka |
| 2012/0311034 | A1 | 12/2012 | Goldband |
| 2012/0316916 | A1 | 12/2012 | Andrews |
| 2012/0317088 | A1 | 12/2012 | Pantel |
| 2012/0331063 | A1 | 12/2012 | Rajaram |
| 2013/0031106 | A1 | 1/2013 | Schechter |
| 2013/0041876 | A1 | 2/2013 | Dow |
| 2013/0060582 | A1 | 3/2013 | Cutino |
| 2013/0066876 | A1 | 3/2013 | Raskino |
| 2013/0073388 | A1 | 3/2013 | Heath |
| 2013/0086057 | A1 | 4/2013 | Harrington |
| 2013/0124538 | A1 | 5/2013 | Lee |
| 2013/0124542 | A1 | 5/2013 | Lee |
| 2013/0144899 | A1 | 6/2013 | Lee |
| 2013/0191372 | A1 | 7/2013 | Lee |
| 2013/0191416 | A1 | 7/2013 | Lee |
| 2013/0198219 | A1 | 8/2013 | Cohen |
| 2013/0226918 | A1 | 8/2013 | Berkhim |
| 2013/0232427 | A1* | 9/2013 | Romero ................ H04L 65/403 715/753 |

(56) References Cited

U.S. PATENT DOCUMENTS

| | | | |
|---|---|---|---|
| 2013/0246404 A1 | 9/2013 | Annau | |
| 2013/0254133 A1* | 9/2013 | Connell | G06Q 10/00 705/342 |
| 2013/0290091 A1* | 10/2013 | Benyamin | G06Q 30/0269 705/14.41 |
| 2013/0325704 A1* | 12/2013 | Gorman | G06Q 50/265 705/39 |
| 2013/0325878 A1* | 12/2013 | de Lichana | G06F 16/22 707/748 |
| 2013/0339180 A1 | 12/2013 | LaPierre | |
| 2013/0346403 A1 | 12/2013 | Petersen | |
| 2014/0025724 A1 | 1/2014 | Granger | |
| 2014/0122465 A1 | 5/2014 | Bilinski | |
| 2014/0123247 A1 | 5/2014 | Abhyanker | |
| 2014/0164062 A1 | 6/2014 | Wen | |
| 2014/0189002 A1 | 7/2014 | Orioli | |
| 2014/0195625 A1 | 7/2014 | Weldon | |
| 2014/0324442 A1* | 10/2014 | Barnes, III | H04L 41/22 705/1.1 |
| 2015/0026196 A1 | 1/2015 | Liang | |
| 2015/0026214 A1 | 1/2015 | Monahan | |
| 2015/0039361 A1* | 2/2015 | Crowther | G06Q 10/0631 705/7.12 |
| 2015/0067043 A1 | 3/2015 | Agarwal | |
| 2015/0156206 A1 | 6/2015 | Redlich | |
| 2015/0169722 A1 | 6/2015 | Schueppert | |
| 2015/0186378 A1 | 7/2015 | Berlingerio | |
| 2015/0254230 A1* | 9/2015 | Papadopoullos | G06F 16/31 704/8 |
| 2015/0264006 A1 | 9/2015 | Parra | |
| 2015/0304300 A1* | 10/2015 | Bender | H04L 12/1895 726/4 |
| 2015/0324396 A1* | 11/2015 | Sheik Adam | H04L 63/0407 707/792 |
| 2015/0324805 A1 | 11/2015 | Skiba | |
| 2015/0326624 A1 | 11/2015 | Rajendran | |
| 2015/0363694 A1* | 12/2015 | Banerjee | G06F 9/542 706/46 |
| 2016/0063547 A1 | 3/2016 | Ghosh | |
| 2017/0048183 A1 | 2/2017 | Glick | |
| 2017/0206557 A1* | 7/2017 | Abrol | G06Q 30/0261 |
| 2017/0300582 A1* | 10/2017 | King | G06F 16/9535 |

\* cited by examiner

CIVIC ISSUES PLATFORMS ON ONLINE SOCIAL NETWORKS

PRIORITY

This application is a continuation under 35 U.S.C. § 120 of U.S. patent application Ser. No. 14/716,742, filed 19 May 2015, which is incorporated herein by reference.

TECHNICAL FIELD

This disclosure generally relates to platforms for managing and tracking civic issues, particularly within the context of online social networks.

BACKGROUND

A social-networking system, which may include a social-networking website, may enable its users (such as persons or organizations) to interact with it and with each other through it. The social-networking system may, with input from a user, create and store in the social-networking system a user profile associated with the user. The user profile may include demographic information, communication-channel information, and information on personal interests of the user. The social-networking system may also, with input from a user, create and store a record of relationships of the user with other users of the social-networking system, as well as provide services (e.g. wall posts, photo-sharing, event organization, messaging, games, or advertisements) to facilitate social interaction between or among users.

The social-networking system may send over one or more networks content or messages related to its services to a mobile or other computing device of a user. A user may also install software applications on a mobile or other computing device of the user for accessing a user profile of the user and other data within the social-networking system. The social-networking system may generate a personalized set of content objects to display to a user, such as a newsfeed of aggregated stories of other users connected to the user.

Social-graph analysis views social relationships in terms of network theory consisting of nodes and edges. Nodes represent the individual users within the networks, and edges represent the relationships between the users. The resulting graph-based structures are often very complex. In its simplest form, a social graph is a map of all of the relevant edges between all the nodes being studied.

SUMMARY OF PARTICULAR EMBODIMENTS

In particular embodiments, a social-networking system may promote civic engagement via an online social network. The social-networking system may provide a civic-issues platform for users to engage in civic issues in their communities. As an example, a civic issue may be fixing a pothole on a junction of Mission Street and 5th Street in San Francisco. As another example, a civic issue may be associated with improving a design of an electoral voting machine. The users of the civic-issues platform may include users of the online social network or third-party users who are not associated with the online social network. Furthermore, the civic-issues platform may connect to a public-agency system associated with an agency of a municipality, such as San Francisco Public Works for the city of San Francisco, to allow the general public to post new civic issues and track resolution of the posted civic issues. In particular embodiments, the civic-issues platform may be utilized to galvanize public support for resolving the posted civic issues. Accordingly, the civic-issues platform may enable and encourage particular users of the communities and agencies responsible for resolving the posted civic issues to mutually engage in resolving the posted civic issues.

In particular embodiments, the civic-issues platform may measure performances of agencies for resolving civic issues. For example, the civic-issues platform may measure a performance of a particular agency based on how users of the online social network respond toward resolutions of posted civic issues by the particular agency. In particular embodiments, the civic-issues platform may calculate performance scores to a pre-determined cluster of agencies for resolving civic issues, aggregate the calculated performance scores to determine a threshold performance score, and rank the performance of each agency of the pre-determined cluster of agencies based on the determined threshold performance score. Accordingly, the civic-issues platform may rank the particular agency against other agencies within the municipality of the particular agency. The civic-issues platform may even rank the particular agency against other agencies in the world.

In particular embodiments, the civic-issues platform may provide monetary incentives for agencies to continuously engage users in civic engagements. For example, the social-networking system may identify one or more user-clusters for targeted advertising on the online social network to be associated with a user of the civic-issues platform based at least on previous interactions of the user with the civic-issues platform. Furthermore, the social-networking system may share the advertising revenue generated from the targeted advertising with the agencies. Such sharing of the advertising revenue may even provide incentives for users to generate revenue for their communities by engaging in civic issues that affect them.

The embodiments disclosed above are only examples, and the scope of this disclosure is not limited to them. Particular embodiments may include all, some, or none of the components, elements, features, functions, operations, or steps of the embodiments disclosed above. Embodiments according to the invention are in particular disclosed in the attached claims directed to a method, a storage medium, a system and a computer program product, wherein any feature mentioned in one claim category, e.g. method, can be claimed in another claim category, e.g. system, as well. The dependencies or references back in the attached claims are chosen for formal reasons only. However any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

DESCRIPTION OF EXAMPLE EMBODIMENTS

System Overview

Figure 1:
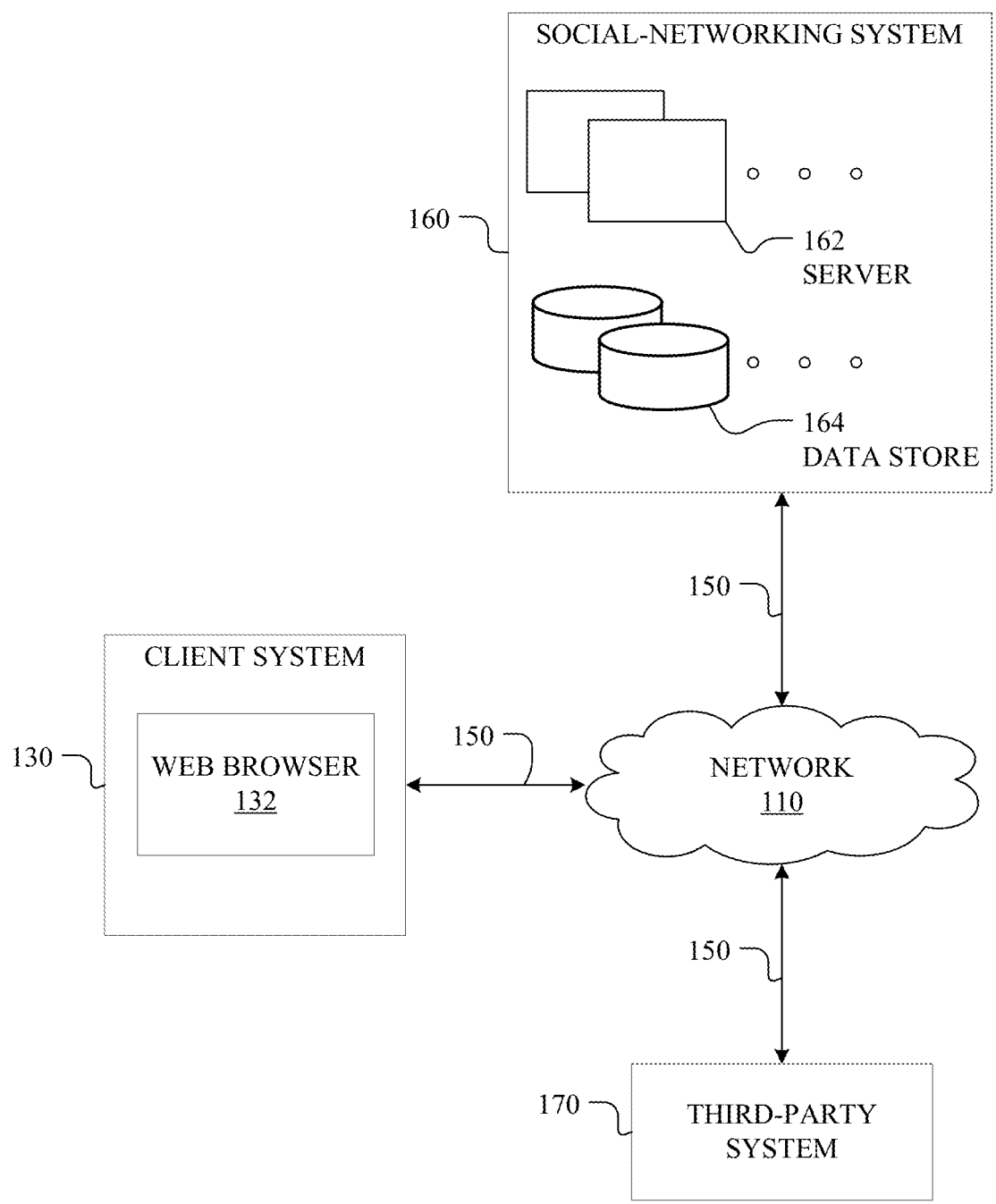
FIG. 1 illustrates an example network environment associated with a social-networking system.

FIG. 1 illustrates an example network environment 100 associated with a social-networking system. Network environment 100 includes a client system 130, a social-networking system 160, and a third-party system 170 connected to each other by a network 110. Although FIG. 1 illustrates a particular arrangement of client system 130, social-networking system 160, third-party system 170, and network 110, this disclosure contemplates any suitable arrangement of client system 130, social-networking system 160, third-party system 170, and network 110. As an example and not by way of limitation, two or more of client system 130, social-networking system 160, and third-party system 170 may be connected to each other directly, bypassing network 110. As another example, two or more of client system 130, social-networking system 160, and third-party system 170 may be physically or logically co-located with each other in whole or in part. Moreover, although FIG. 1 illustrates a particular number of client systems 130, social-networking systems 160, third-party systems 170, and networks 110, this disclosure contemplates any suitable number of client systems 130, social-networking systems 160, third-party systems 170, and networks 110. As an example and not by way of limitation, network environment 100 may include multiple client system 130, social-networking systems 160, third-party systems 170, and networks 110.

This disclosure contemplates any suitable network 110. As an example and not by way of limitation, one or more portions of network 110 may include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, or a combination of two or more of these. Network 110 may include one or more networks 110.

Links 150 may connect client system 130, social-networking system 160, and third-party system 170 to communication network 110 or to each other. This disclosure contemplates any suitable links 150. In particular embodiments, one or more links 150 include one or more wireline (such as for example Digital Subscriber Line (DSL) or Data Over Cable Service Interface Specification (DOCSIS)), wireless (such as for example Wi-Fi or Worldwide Interoperability for Microwave Access (WiMAX)), or optical (such as for example Synchronous Optical Network (SONET) or Synchronous Digital Hierarchy (SDH)) links. In particular embodiments, one or more links 150 each include an ad hoc network, an intranet, an extranet, a VPN, a LAN, a WLAN, a WAN, a WWAN, a MAN, a portion of the Internet, a portion of the PSTN, a cellular technology-based network, a satellite communications technology-based network, another link 150, or a combination of two or more such links 150. Links 150 need not necessarily be the same throughout network environment 100. One or more first links 150 may differ in one or more respects from one or more second links 150.

In particular embodiments, client system 130 may be an electronic device including hardware, software, or embedded logic components or a combination of two or more such components and capable of carrying out the appropriate functionalities implemented or supported by client system 130. As an example and not by way of limitation, a client system 130 may include a computer system such as a desktop computer, notebook or laptop computer, netbook, a tablet computer, e-book reader, GPS device, camera, personal digital assistant (PDA), handheld electronic device, cellular telephone, smartphone, augmented/virtual reality device, other suitable electronic device, or any suitable combination thereof. This disclosure contemplates any suitable client systems 130. A client system 130 may enable a network user at client system 130 to access network 110. A client system 130 may enable its user to communicate with other users at other client systems 130.

In particular embodiments, client system 130 may include a web browser 132, and may have one or more add-ons, plug-ins, or other extensions. A user at client system 130 may enter a Uniform Resource Locator (URL) or other address directing the web browser 132 to a particular server (such as server 162, or a server associated with a third-party system 170), and the web browser 132 may generate a Hyper Text Transfer Protocol (HTTP) request and communicate the HTTP request to server. The server may accept the HTTP request and communicate to client system 130 one or more Hyper Text Markup Language (HTML) files responsive to the HTTP request. Client system 130 may render a webpage based on the HTML files from the server for presentation to the user. This disclosure contemplates any suitable webpage files. As an example and not by way of limitation, webpages may render from HTML files, Extensible Hyper Text Markup Language (XHTML) files, or Extensible Markup Language (XML) files, according to particular needs. Such pages may also execute scripts, combinations of markup language and scripts, and the like. Herein, reference to a webpage encompasses one or more corresponding webpage files (which a browser may use to render the webpage) and vice versa, where appropriate.

In particular embodiments, social-networking system 160 may be a network-addressable computing system that can host an online social network. Social-networking system 160 may generate, store, receive, and send social-networking data, such as, for example, user-profile data, concept-profile data, social-graph information, or other suitable data related to the online social network. Social-networking system 160 may be accessed by the other components of network environment 100 either directly or via network 110. As an example and not by way of limitation, client system 130 may access social-networking system 160 using a web browser 132, or a native application associated with social-networking system 160 (e.g., a mobile social-networking application, a messaging application, another suitable application, or any combination thereof) either directly or via network 110. In particular embodiments, social-networking system 160 may include one or more servers 162. Each server 162 may be a unitary server or a distributed server spanning multiple computers or multiple datacenters. Servers 162 may be of various types, such as, for example and without limitation, web server, news server, mail server, message server, advertising server, file server, application server, exchange server, database server, proxy server, another server suitable for performing functions or processes described herein, or any combination thereof. In particular embodiments, each server 162 may include hardware, software, or embedded logic components or a combination of two or more such components for carrying out the appropriate functionalities implemented or supported by server 162. In particular embodiments, social-networking system 160 may include one or more data stores 164. Data stores 164 may be used to store various types of information. In particular embodiments, the information stored in data stores 164 may be organized according to specific data structures. In particular embodiments, each data store 164 may be a relational, columnar, correlation, or other suitable database. Although this disclosure describes or illustrates particular types of databases, this disclosure contemplates any suitable types of databases. Particular embodiments may provide interfaces that enable a client system 130, a social-networking system 160, or a third-party system 170 to manage, retrieve, modify, add, or delete, the information stored in data store 164.

In particular embodiments, social-networking system 160 may store one or more social graphs in one or more data stores 164. In particular embodiments, a social graph may include multiple nodes—which may include multiple user nodes (each corresponding to a particular user) or multiple concept nodes (each corresponding to a particular concept)—and multiple edges connecting the nodes. Social-networking system 160 may provide users of the online social network the ability to communicate and interact with other users. In particular embodiments, users may join the online social network via social-networking system 160 and then add connections (e.g., relationships) to a number of other users of social-networking system 160 whom they want to be connected to. Herein, the term "friend" may refer to any other user of social-networking system 160 with whom a user has formed a connection, association, or relationship via social-networking system 160.

In particular embodiments, social-networking system 160 may provide users with the ability to take actions on various types of items or objects, supported by social-networking system 160. As an example and not by way of limitation, the items and objects may include groups or social networks to which users of social-networking system 160 may belong, events or calendar entries in which a user might be interested, computer-based applications that a user may use, transactions that allow users to buy or sell items via the service, interactions with advertisements that a user may perform, or other suitable items or objects. A user may interact with anything that is capable of being represented in social-networking system 160 or by an external system of third-party system 170, which is separate from social-networking system 160 and coupled to social-networking system 160 via a network 110.

In particular embodiments, social-networking system 160 may be capable of linking a variety of entities. As an example and not by way of limitation, social-networking system 160 may enable users to interact with each other as well as receive content from third-party systems 170 or other entities, or to allow users to interact with these entities through an application programming interfaces (API) or other communication channels.

In particular embodiments, a third-party system 170 may include one or more types of servers, one or more data stores, one or more interfaces, including but not limited to APIs, one or more web services, one or more content sources, one or more networks, or any other suitable components, e.g., that servers may communicate with. A third-party system 170 may be operated by a different entity from an entity operating social-networking system 160. In particular embodiments, however, social-networking system 160 and third-party systems 170 may operate in conjunction with each other to provide social-networking services to users of social-networking system 160 or third-party systems 170. In this sense, social-networking system 160 may provide a platform, or backbone, which other systems, such as third-party systems 170, may use to provide social-networking services and functionality to users across the Internet.

In particular embodiments, a third-party system 170 may include a third-party content object provider. A third-party content object provider may include one or more sources of content objects, which may be communicated to a client system 130. As an example and not by way of limitation, content objects may include information regarding things or activities of interest to the user, such as, for example, movie show times, movie reviews, restaurant reviews, restaurant menus, product information and reviews, or other suitable information. As another example and not by way of limitation, content objects may include incentive content objects, such as coupons, discount tickets, gift certificates, or other suitable incentive objects.

In particular embodiments, social-networking system 160 also includes user-generated content objects, which may enhance a user's interactions with social-networking system 160. User-generated content may include anything a user can add, upload, send, or "post" to social-networking system 160. As an example and not by way of limitation, a user communicates posts to social-networking system 160 from a client system 130. Posts may include data such as status updates or other textual data, location information, photos, videos, links, music or other similar data or media. Content may also be added to social-networking system 160 by a third-party through a "communication channel," such as a newsfeed or stream.

particular embodiments, social-networking system 160 may include a variety of servers, sub-systems, programs, modules, logs, and data stores. In particular embodiments, social-networking system 160 may include one or more of the following: a web server, action logger, API-request server, relevance-and-ranking engine, content-object classifier, notification controller, action log, third-party-content-object-exposure log, inference module, authorization/privacy server, search module, advertisement-targeting module, user-interface module, user-profile store, connection store, third-party content store, or location store. Social-networking system 160 may also include suitable components such as network interfaces, security mechanisms, load balancers, failover servers, management-and-network-operations consoles, other suitable components, or any suitable combination thereof. In particular embodiments, social-networking system 160 may include one or more user-profile stores for storing user profiles. A user profile may include, for example, biographic information, demographic information, behavioral information, social information, or other types of descriptive information, such as work experience, educational history, hobbies or preferences, interests, affinities, or location. Interest information may include interests related to one or more categories. Categories may be general or specific. As an example and not by way of limitation, if a user "likes" an article about a brand of shoes the category may be the brand, or the general category of "shoes" or "clothing." A connection store may be used for storing connection information about users. The connection information may indicate users who have similar or common work experience, group memberships, hobbies, educational history, or are in any way related or share common attributes. The connection information may also include user-defined connections between different users and content (both internal and external). A web server may be used for linking social-networking system 160 to one or more client systems 130 or one or more third-party system 170 via network 110. The web server may include a mail server or other messaging functionality for receiving and routing messages between social-networking system 160 and one or more client systems 130. An API-request server may allow a third-party system 170 to access information from social-networking system 160 by calling one or more APIs. An action logger may be used to receive communications from a web server about a user's actions on or off social-networking system 160. In conjunction with the action log, a third-party-content-object log may be maintained of user exposures to third-party-content objects. A notification controller may provide information regarding content objects to a client system 130. Information may be pushed to a client system 130 as notifications, or information may be pulled from client system 130 responsive to a request received from client system 130. Authorization servers may be used to enforce one or more privacy settings of the users of social-networking system 160. A privacy setting of a user determines how particular information associated with a user can be shared. The authorization server may allow users to opt in to or opt out of having their actions logged by social-networking system 160 or shared with other systems (e.g., third-party system 170), such as, for example, by setting appropriate privacy settings. Third-party-content-object stores may be used to store content objects received from third parties, such as a third-party system 170. Location stores may be used for storing location information received from client systems 130 associated with users. Advertisement-pricing modules may combine social information, the current time, location information, or other suitable information to provide relevant advertisements, in the form of notifications, to a user.

Social Graphs

Figure 2:
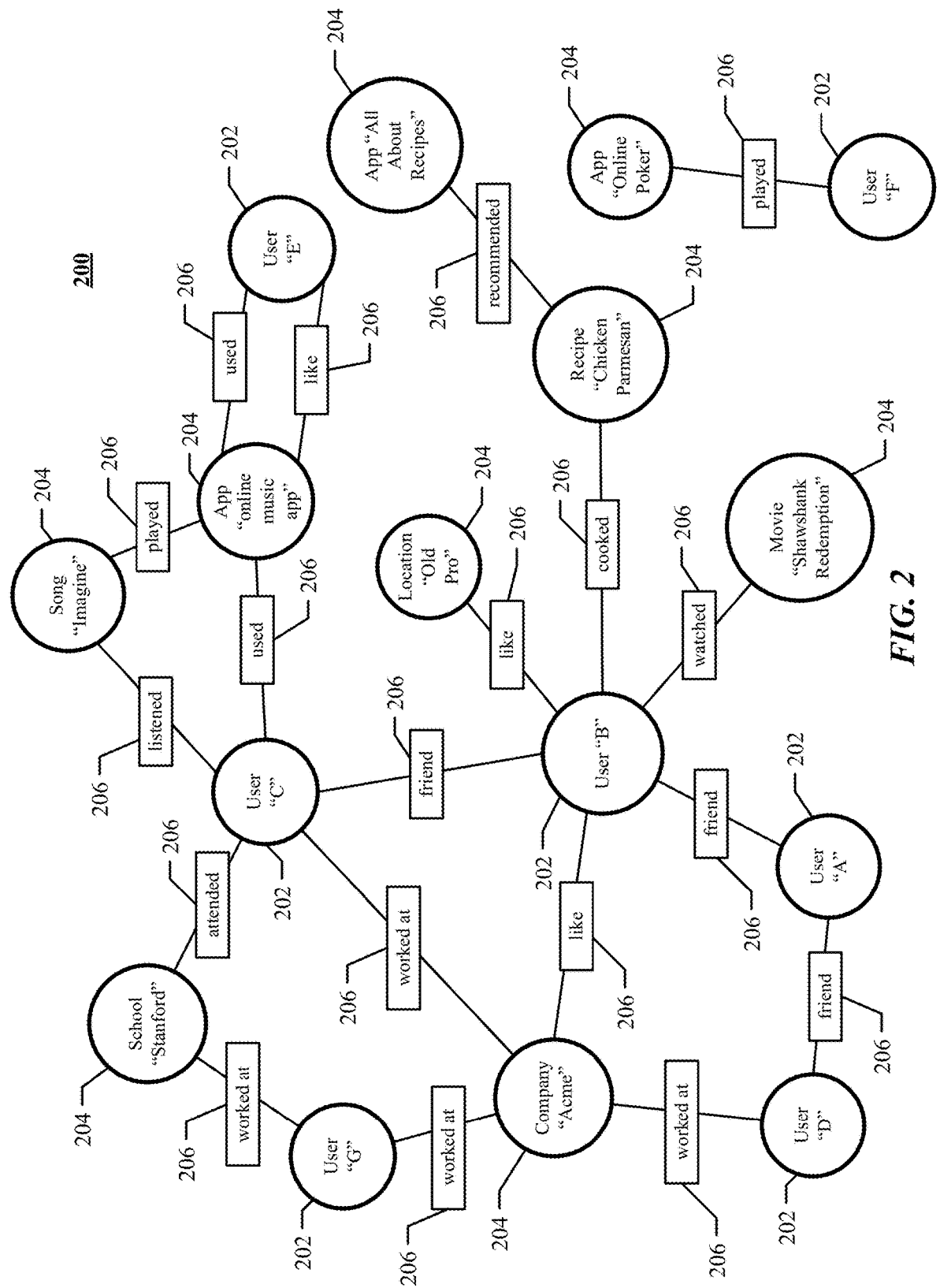
FIG. 2 illustrates an example social graph.

FIG. 2 illustrates example social graph 200. In particular embodiments, social-networking system 160 may store one or more social graphs 200 in one or more data stores. In particular embodiments, social graph 200 may include multiple nodes—which may include multiple user nodes 202 or multiple concept nodes 204—and multiple edges 206 connecting the nodes. Example social graph 200 illustrated in FIG. 2 is shown, for didactic purposes, in a two-dimensional visual map representation. In particular embodiments, a social-networking system 160, client system 130, or third-party system 170 may access social graph 200 and related social-graph information for suitable applications. The nodes and edges of social graph 200 may be stored as data objects, for example, in a data store (such as a social-graph database). Such a data store may include one or more searchable or queryable indexes of nodes or edges of social graph 200.

In particular embodiments, a user node 202 may correspond to a user of social-networking system 160. As an example and not by way of limitation, a user may be an individual (human user), an entity (e.g., an enterprise, business, or third-party application), or a group (e.g., of individuals or entities) that interacts or communicates with or over social-networking system 160. In particular embodiments, when a user registers for an account with social-networking system 160, social-networking system 160 may create a user node 202 corresponding to the user, and store the user node 202 in one or more data stores. Users and user nodes 202 described herein may, where appropriate, refer to registered users and user nodes 202 associated with registered users. In addition or as an alternative, users and user nodes 202 described herein may, where appropriate, refer to users that have not registered with social-networking system 160. In particular embodiments, a user node 202 may be associated with information provided by a user or information gathered by various systems, including social-networking system 160. As an example and not by way of limitation, a user may provide his or her name, profile picture, contact information, birth date, sex, marital status, family status, employment, education background, preferences, interests, or other demographic information. In particular embodiments, a user node 202 may be associated with one or more data objects corresponding to information associated with a user. In particular embodiments, a user node 202 may correspond to one or more webpages.

In particular embodiments, a concept node 204 may correspond to a concept. As an example and not by way of limitation, a concept may correspond to a place (such as, for example, a movie theater, restaurant, landmark, or city); a website (such as, for example, a website associated with social-network system 160 or a third-party website associated with a web-application server); an entity (such as, for example, a person, business, group, sports team, or celebrity); a resource (such as, for example, an audio file, video file, digital photo, text file, structured document, or application) which may be located within social-networking system 160 or on an external server, such as a web-application server; real or intellectual property (such as, for example, a sculpture, painting, movie, game, song, idea, photograph, or written work); a game; an activity; an idea or theory; an object in a augmented/virtual reality environment; another suitable concept; or two or more such concepts. A concept node 204 may be associated with information of a concept provided by a user or information gathered by various systems, including social-networking system 160. As an example and not by way of limitation, information of a concept may include a name or a title; one or more images (e.g., an image of the cover page of a book); a location (e.g., an address or a geographical location); a website (which may be associated with a URL); contact information (e.g., a phone number or an email address); other suitable concept information; or any suitable combination of such information. In particular embodiments, a concept node 204 may be associated with one or more data objects corresponding to information associated with concept node 204. In particular embodiments, a concept node 204 may correspond to one or more webpages.

In particular embodiments, a node in social graph 200 may represent or be represented by a webpage (which may be referred to as a "profile page"). Profile pages may be hosted by or accessible to social-networking system 160. Profile pages may also be hosted on third-party websites associated with a third-party server 170. As an example and not by way of limitation, a profile page corresponding to a particular external webpage may be the particular external webpage and the profile page may correspond to a particular concept node 204. Profile pages may be viewable by all or a selected subset of other users. As an example and not by way of limitation, a user node 202 may have a corresponding user-profile page in which the corresponding user may add content, make declarations, or otherwise express himself or herself. As another example and not by way of limitation, a concept node 204 may have a corresponding concept-profile page in which one or more users may add content, make declarations, or express themselves, particularly in relation to the concept corresponding to concept node 204.

In particular embodiments, a concept node 204 may represent a third-party webpage or resource hosted by a third-party system 170. The third-party webpage or resource may include, among other elements, content, a selectable or other icon, or other inter-actable object representing an action or activity. As an example and not by way of limitation, a third-party webpage may include a selectable icon such as "like," "check-in," "eat," "recommend," or another suitable action or activity. A user viewing the third-party webpage may perform an action by selecting one of the icons (e.g., "check-in"), causing a client system 130 to send to social-networking system 160 a message indicating the user's action. In response to the message, social-networking system 160 may create an edge (e.g., a check-in-type edge) between a user node 202 corresponding to the user and a concept node 204 corresponding to the third-party webpage or resource and store edge 206 in one or more data stores.

In particular embodiments, a pair of nodes in social graph 200 may be connected to each other by one or more edges 206. An edge 206 connecting a pair of nodes may represent a relationship between the pair of nodes. In particular embodiments, an edge 206 may include or represent one or more data objects or attributes corresponding to the relationship between a pair of nodes. As an example and not by way of limitation, a first user may indicate that a second user is a "friend" of the first user. In response to this indication, social-networking system 160 may send a "friend request" to the second user. If the second user confirms the "friend request," social-networking system 160 may create an edge 206 connecting the first user's user node 202 to the second user's user node 202 in social graph 200 and store edge 206 as social-graph information in one or more of data stores 164. In the example of FIG. 2, social graph 200 includes an edge 206 indicating a friend relation between user nodes 202 of user "A" and user "B" and an edge indicating a friend relation between user nodes 202 of user "C" and user "B." Although this disclosure describes or illustrates particular edges 206 with particular attributes connecting particular user nodes 202, this disclosure contemplates any suitable edges 206 with any suitable attributes connecting user nodes 202. As an example and not by way of limitation, an edge 206 may represent a friendship, family relationship, business or employment relationship, fan relationship (including, e.g., liking, etc.), follower relationship, visitor relationship (including, e.g., accessing, viewing, checking-in, sharing, etc.), subscriber relationship, superior/subordinate relationship, reciprocal relationship, non-reciprocal relationship, another suitable type of relationship, or two or more such relationships. Moreover, although this disclosure generally describes nodes as being connected, this disclosure also describes users or concepts as being connected. Herein, references to users or concepts being connected may, where appropriate, refer to the nodes corresponding to those users or concepts being connected in social graph 200 by one or more edges 206.

In particular embodiments, an edge 206 between a user node 202 and a concept node 204 may represent a particular action or activity performed by a user associated with user node 202 toward a concept associated with a concept node 204. As an example and not by way of limitation, as illustrated in FIG. 2, a user may "like," "attended," "played," "listened," "cooked," "worked at," or "watched" a concept, each of which may correspond to an edge type or subtype.

A concept-profile page corresponding to a concept node 204 may include, for example, a selectable "check in" icon (such as, for example, a clickable "check in" icon) or a selectable "add to favorites" icon. Similarly, after a user clicks these icons, social-networking system 160 may create a "favorite" edge or a "check in" edge in response to a user's action corresponding to a respective action. As another example and not by way of limitation, a user (user "C") may listen to a particular song ("Imagine") using a particular application (third-party online music application). In this case, social-networking system 160 may create a "listened" edge 206 and a "used" edge (as illustrated in FIG. 2) between user nodes 202 corresponding to the user and concept nodes 204 corresponding to the song and application to indicate that the user listened to the song and used the application. Moreover, social-networking system 160 may create a "played" edge 206 (as illustrated in FIG. 2) between concept nodes 204 corresponding to the song and the application to indicate that the particular song was played by the particular application. In this case, "played" edge 206 corresponds to an action performed by an external application (third-party online music application) on an external audio file (the song "Imagine"). Although this disclosure describes particular edges 206 with particular attributes connecting user nodes 202 and concept nodes 204, this disclosure contemplates any suitable edges 206 with any suitable attributes connecting user nodes 202 and concept nodes 204. Moreover, although this disclosure describes edges between a user node 202 and a concept node 204 representing a single relationship, this disclosure contemplates edges between a user node 202 and a concept node 204 representing one or more relationships. As an example and not by way of limitation, an edge 206 may represent both that a user likes and has used at a particular concept. Alternatively, another edge 206 may represent each type of relationship (or multiples of a single relationship) between a user node 202 and a concept node 204 (as illustrated in FIG. 2 between user node 202 for user "E" and concept node 204 for "a third-party online music application").

In particular embodiments, social-networking system 160 may create an edge 206 between a user node 202 and a concept node 204 in social graph 200. As an example and not by way of limitation, a user viewing a concept-profile page (such as, for example, by using a web browser or a special-purpose application hosted by the user's client system 130) may indicate that he or she likes the concept represented by the concept node 204 by clicking or selecting a "Like" icon, which may cause the user's client system 130 to send to social-networking system 160 a message indicating the user's liking of the concept associated with the concept-profile page. In response to the message, social-networking system 160 may create an edge 206 between user node 202 associated with the user and concept node 204, as illustrated by "like" edge 206 between the user and concept node 204. In particular embodiments, social-networking system 160 may store an edge 206 in one or more data stores. In particular embodiments, an edge 206 may be automatically formed by social-networking system 160 in response to a particular user action. As an example and not by way of limitation, if a first user uploads a picture, watches a movie, or listens to a song, an edge 206 may be formed between user node 202 corresponding to the first user and concept nodes 204 corresponding to those concepts. Although this disclosure describes forming particular edges 206 in particular manners, this disclosure contemplates forming any suitable edges 206 in any suitable manner.

Civic-Issues Platforms

In particular embodiments, a user's desire to share content on an online social network may be triggered by events associated with the community which the user lives in. As an example and not by way of limitation, an event may be associated with a governmental issue in the community, volunteering in the community, an election of a public administration person for the community, managing a resource of the community, or other civic issues of interest to the user. The user may post comments online to address the events. However, such content being shared online by the user may have limited visibilities. As an example and not by way of limitation, a government agency may host a website allowing general public users to share content corresponding to civic issues associated with their communities. However, such shared content may be limited to targeted messages, posted petitions, or organized rallies among users of the website. Furthermore, the website may not be connected to government databases. As such, civic issues that are posted by users on the website may not be made aware to the actual government administrators who could resolve them.

In particular embodiments, social-networking system 160 may provide a civic-issues platform for promoting civic engagement via the online social network, where the civic-issues platform could enable users of the online social network to engage civic issues in their communities. Social-networking system 160 may provide users of the civic-issues platform with user-interface tools to, for example, create, submit, share, or track content related to civic issues on the online social network via texts, photos, videos, posts, or any other suitable means. The content may be further commented on, liked, or shared on the online social network. In particular embodiments, users of the civic-issues platform may already be familiar with utilizing social-networking system 160 to post particular issues, track particular issues, register support for particular issues, or micro-engage particular users via one or more micro-engagements to galvanize support for particular issues on the online social network. As such, the users may not require substantial instructions to utilize the civic-issues platform. As yet another example and not by way of limitation, social-networking system 160 may monetize social media activity, such as users' engagements, on the civic-issues platform by presenting targeted advertisements relevant to the users of the civic-issues platform on the online social network. Furthermore, social-networking system 160 may share the advertising revenue generated from the targeted advertising with the agencies. Such sharing of the advertising revenue between the social-networking system 160 and the agencies may provide incentives for users to generate revenue for their communities by engaging in civic issues that affect them. Although this disclosure describes particular embodiments as providing particular advantages, particular embodiments may provide none, some, or all of these advantages.

Figure 3:
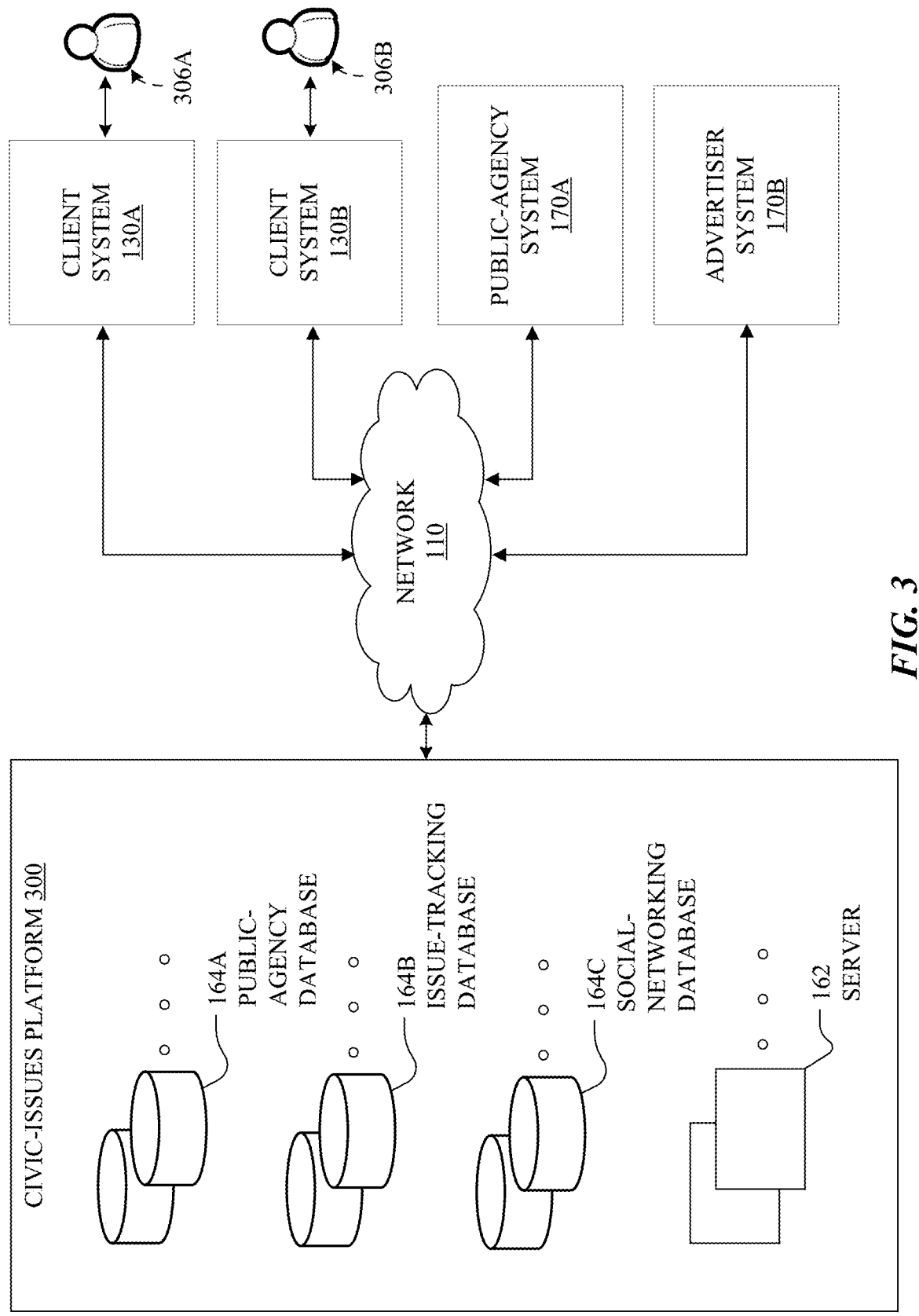
FIG. 3 illustrates the network environment of FIG. 1 associated with a civic-issues platform.

FIG. 3 illustrates an example network environment associated with civic-issues platform 300. In particular embodiments, civic-issues platform 300 may include one or more public-agency databases 164A, one or more issue-tracking databases 164B, one or more social-networking databases 164C, and one or more servers 162. In particular embodiments, social-networking database 164C may store social-networking data, such as social graph 200, of social-networking system 160 as discussed above. Civic-issues platform 300 may communicate with one or more client systems 130 via network 110. Furthermore, the one or more client systems 130 may be associated with one or more users 306, respectively. Civic-issues platform 300 may also communicate with one or more public-agency systems 170A and one or more advertiser systems 170B via network 110. In particular embodiments, civic-issues platform 300 may be a subsystem of social-networking system 160. Although FIG. 3 illustrates a particular arrangement of client systems 130, civic-issues platform 300, public-agency system 170A, advertiser system 170B, and network 110, this disclosure contemplates any suitable arrangement of client systems 130, civic-issues platform 300, public-agency system 170A, advertiser system 170B, and network 110. Moreover, although FIG. 1 illustrates a particular number of client systems 130, civic-issues platforms 300, public-agency systems 170A, advertiser systems 170B, and network 110, this disclosure contemplates any suitable number of client systems 130, civic-issues platforms 300, public-agency systems 170A, advertiser systems 170B, and networks 110.

In particular embodiments, public-agency database 164A may be associated with a particular public agency of a municipality. Furthermore, public-agency database 164A may store information associated with one or more civic issues previously resolved by the public agency. As an example and not by way of limitation, for each civic issue previously resolved by the public agency, public-agency database 160A may store text describing the civic issue when it was first posted on civic-issues platform 300, one or more locations associated with the civic issue, one or more updates for the resolution of the civic issues posted by the public agency, one or more feedbacks from users associated with the civic issue posted on civic-issues platform 300, a resolution of the civic issue, other information associated with the civic issue, or any suitable combination thereof. Although this disclosure illustrates and describes storing particular civic issues in a particular manner, the disclosure contemplates storing any suitable civic issues in any suitable manner.

In particular embodiments, public-agency database 164A may store one or more classification-keywords associated with the particular public agency. Such classification-keywords may be utilized by civic-issues platform 300 to determine a classification of a post as discussed below. As an example and not by way of limitation, public-agency database 164A associated with the San Francisco Public Works may store classification-keywords such as "traffic", "light", "graffiti", "park", "urban", "building", "construction", "remodeling", "street", "sidewalk", "tree", "planting", "sewer", "pothole", "curb", "ramp", "landscape", or any other suitable classification-keywords. As another example and not by way of limitation, public-agency database 164A associated with the San Francisco Police Department may store classification-keywords such as "graffiti", "traffic", "pothole", "fire", "safety", "crime", "hotline", "vandalism", "flood", "accident", or any other suitable classification-keywords. In particular embodiments, one or more classification-keywords of public-agency database 164A may correspond to types of work performed by the public agency. As an example and not by way of limitation, particular classification-keywords of public-agency database 164A associated with the San Francisco Public Works corresponding to types of work may include "wiring", "painting", "remodeling", "carpentry", "drywall finishing", "plumbing", and "asphalt patching". As another example and not by way of limitation, particular classification-keywords of public-agency database 164A associated with the San Francisco Police Department corresponding to types of work may include "traffic policing", "crime investigation", and "graffiti removal". In particular embodiments, one or more classification-keywords of public-agency database 164A may correspond to scopes of work performed by the public agency. As an example and not by way of limitation, particular classification-keywords of public-agency database 164A associated with the San Francisco Public Works corresponding to scopes of work may include "building construction", "building repair", "electrical, plumbing", "patch-paving", and "street mapping". As another example and not by way of limitation, particular classification-keywords of public-agency database 164A associated with the San Francisco Police Department corresponding to scopes of work may include "traffic control", "crime investigation", "neighborhood watch", and "graffiti abatement". Although this disclosure describes using particular classification-keywords associated with particular public agencies, the disclosure contemplates using any suitable classification-keywords associated with any suitable public agencies.

In particular embodiments, issue-tracking database 164B may store information associated with posts corresponding to civic issues that are currently pending with civic-issues platform 300. As an example and not by way of limitation, for each civic issue that is currently pending with civic-issues platform 300, issue-tracking database 164B may store information associated with the civic issue such as, for example, the text describing the civic issue, the location associated with the civic issues, the user-reported category corresponding to the civic issue, one or more updates associated with the civic issue posted on civic-issues platform 300 by any suitable entity such as the user who posted the civic-issue, any other user of social-networking system 160, or the public agency assigned to resolve the civic issue, one or more tags associated with the civic issue, or any suitable combination thereof. Although this disclosure illustrates and describes particular issue-tracking database within civic-issues platform 300 in a particular manner, the disclosure contemplates any suitable issue-tracking database within any suitable civic-issues platform in any suitable manner.

In particular embodiments, civic-issues platform 300 may allow users to create posts on the online social network corresponding to particular civic issues. This may also enable the users to raise awareness of particular civic issues in their communities. As an example and not by way of limitation, a civic issue may be associated with repairing a pothole, fixing a parking issue, removing a tree, or fixing a local electoral-voting issue. As another example and not by way of limitation, a user living in a particular municipality, such as a city or a county, may create a post within a page, such as the example webpage illustrated in FIG. 4, of the online social network via civic-issues platform 300 to log a particular civic issue associated with the municipality. As such, users may leverage the online social network to target particular civic issues associated with their communities. Furthermore, the users may leverage the online social network to raise attention on particular civic issues that concern them. In particular embodiments, the user creating the post on the online social network may be a user of social-networking system 160. Furthermore, civic-issues platform 300 may authenticate the user before the user is able to create the post on the online social network. As an example and not by way of limitation, civic-issues platform 300 may retrieve from social-networking system 160 an indication that the user has logged into the online social network before allowing the user to create the post. In particular embodiments, the user may be an unregistered user of social-networking platform 160. In particular embodiments, the user creating the post on the online social network may be associated with third-party system 170 external to social-networking system 160. As an example and not by way of limitation, a user may access third-party system 170, which may access civic-issues platform 300 on social-networking system 160 via an API associated with social-networking system 160, and present a user-interface for interacting with civic-issues platform 300 via third-party system 170 to the user. Furthermore, third-party system 170 may or may not utilize social-networking system 160 to authenticate the user. Although this disclosure describes particular users utilizing civic-issues platform 300 in a particular manner, the disclosure contemplates any suitable users utilizing any suitable civic-issues platform in any suitable manner.

In particular embodiments, the user may send a request to civic-issues platform 300 to create a post on the online social network corresponding to a particular civic issue. The civic issue may be associated with a particular municipality. In particular embodiments, the user may send the request via a client system, such as client system 130, to civic-issues platform 300. The request may include, for example, text describing the civic issue, a location associated with the civic issue, a user-reported category corresponding to the civic issue, multimedia content (e.g., text, audio, image, animation or video, to illustrate the civic issue), or other suitable data or content. In particular embodiments, the location of the posted civic issue may be retrieved from client system 130 of the user (e.g., a smartphone or other suitable device), and the user may utilize client system 130 to create the post at the location of the civic issue. Accordingly, the location of the civic issue may correspond to the location of client system 130 of the user, and client system 130 may embed the location of the civic issue within the request sent by the user to civic-issues platform 300. In particular embodiments, information corresponding to the location of the civic issue may be retrieved from metadata of an image included with the request. In particular embodiments, the user may add one or more tags to the request for enabling civic-issues platform 300 to assign a suitable agency for resolving the civic issue. As an example and not by way of limitation, the tags may include keywords such as "road", "tree", "fence", "lights", "park", "sign", or any suitable combination thereof. In particular embodiments, the user may select the tags from a pre-determined list of tags when creating the post. In particular embodiments, one or more user-reported categories may be assigned to each of the posted civic issues. As an example and not by way of limitation, a user-reported category may correspond to "hazard", "problem", "maintenance", or "improvement." In particular embodiments, the user-reported category may be assigned manually. As an example and not by way of limitation, a user may determine a user-reported category for a civic issue. In particular embodiments, the user-reported category may be determined by civic-issues platform 300 based at least on the post created by the user. As an example and not by way of limitation, civic-issues platform 300 may parse the text of the post to extract one or more n-grams and automatically determined the user-reported category based at least on one or more of the extracted n-grams. Although this disclosure describes creating posts corresponding to particular civic issues in a particular manner, the disclosure contemplates creating posts corresponding to any suitable civic issue in any suitable manner.

In particular embodiments, in response to receiving the request from the user to post a civic issue on the online social network, civic-issues platform 300 may assign the post to one or more suitable agencies for resolving the civic issue. As an example and not by way of limitation, a civic issue may be associated with pothole repair, or any other suitable infrastructure maintenance issue, within a particular community of San Francisco. Accordingly, a suitable agency assigned to resolve such civic issue may correspond to a government agency for the municipality of San Francisco, such as San Francisco Public Works for the city of San Francisco. In particular embodiments, civic-issues platform 300, or any suitable server of civic-issues platform 300, may determine a classification of the post based at least on the received request. The classification of the post may include one or more types of work for resolving the civic issue. As an example and not by way of limitation, types of work may include wiring, painting, building remodeling, carpentry, drywall finishing, plumbing, asphalt patching, or other suitable types of work for resolving the civic issue. The classification of the post may also include a scope of work for resolving the civic issue. As an example and not by way of limitation, the scope of work may include traffic control, electrical, computer, or any suitable combination thereof. The classification of the post may include an indication of urgency for resolving the civic issue. In particular embodiments, the scope of work may include an indication of urgency associated with the civic issue. As an example and not by way of limitation, a user may indicate the civic issue has a "High", "Medium", or "Low" priority. Although this disclosure describes assigning particular posts corresponding to particular civic issues in a particular manner, the disclosure contemplates assigning any suitable posts corresponding to any suitable civic issues in any suitable manner.

In particular embodiments, civic-issues platform 300 may determine the classification of the post based at least on one or more n-grams extracted from the text describing the civic issue. Civic-issues platform 300 may parse the text to extract the n-grams, and then compare the extracted n-grams with one or more classification-keywords stored in each of the public-agency databases to determine the classification of the post. As an example and not by way of limitation, referencing a malfunctioning traffic light as a posted civic issue, civic-issues platform 300 may extract n-grams, such as "malfunctioning", "traffic", "light", and "street" and compare the extracted n-grams with classification-keywords stored in each of the public-agency databases within civic-issues platform 300 including, but not limited to, the public-agency databases associated with the San Francisco Public Works and the San Francisco Police Department, respectively. Based at least on the comparison, civic-issues platform 300 may determine a classification for the posted civic issue of the malfunctioning traffic light. As an example and not by way of limitation, civic-issues platform 300 may determine a classification that includes traffic control, electrical, and computer as scope of work for repairing the malfunctioning traffic light based at least on the comparison of the extracted n-grams "malfunctioning", "traffic", "light", and "street" with classification-keywords from the public-agency databases associated with the San Francisco Public Works and the San Francisco Police Department, respectively. Although this disclosure describes classifying particular posts corresponding to particular civic issues in a particular manner, the disclosure contemplates classifying any suitable posts corresponding to any suitable civic issues in any suitable manner.

In particular embodiments, civic-issues platform 300 may determine the classification of the post based at least on one or more tags added by the user to the request for creating the post. As an example and not by way of limitation, the user may add tags, such as "traffic", "light", "delay", and "Mission" to the request for posting the civic issue of the malfunctioning traffic light. Thereafter, civic-issues platform 300 may determine a classification that includes traffic control, electrical, and computer as scope of work for repairing the malfunctioning traffic light based at least on the added tags. In particular embodiments, civic-issues platform 300 may determine the classification of the post based at least on social-networking data associated with the user posting the civic issue on civic-issues platform 300. The social-networking data may be retrieved from social-networking database 164C. As an example and not by way of limitation, referencing the posted civic issue of the malfunctioning traffic light, civic-issues platform 300 may retrieve social-networking data, such as social graph 200 associated with the user, that indicates the user lives in a particular geographic location associated with the municipality. Accordingly, based at least the social-networking data, civic-issues platform 300 may determine that the posted civic issue is credible (e.g., not spam) and thereafter determine a classification for the post that indicates a "high" urgency for resolving the civic issue. As another example and not by way of limitation, civic-issues platform 300 may retrieve social-networking data, such as social graph 200 associated with the user, that indicates the user is globally popular based on a high number (e.g., 5000+) of friends or followers of the user on the online social network. Accordingly, based at least on the user's influence/popularity on the online social network indicated by the social-networking data, civic-issues platform 300 may determine a classification for the post that indicates a "high" urgency for resolving the civic issue. In particular embodiments, civic-issues platform 300 may determine the classification of the post based at least on the user-reported category associated with the civic issue. As an example and not by way of limitation, if the user-reported category corresponds to "hazard," civic-issues platform 300 may determine a classification that indicates a "high" urgency for resolving the civic issue. As another example and not by way of limitation, if the user-reported category corresponds to "maintenance," civic-issues platform 300 may determine a classification that indicates a "low" urgency for resolving the civic issue. Although this disclosure describes classifying particular posts corresponding to particular civic issues in a particular manner, the disclosure contemplates classifying any suitable posts corresponding to any suitable civic issues in any suitable manner.

In particular embodiments, civic-issues platform 300 may assign the post associated with the civic issue to one or more agencies of the municipality based at least on the determined classification of the post and the location associated with the posted civic issue. As an example and not by way of limitation, referencing a posted civic issue corresponding to a pothole on a junction of Mission Street and 5th Street in San Francisco, civic-issues platform 300 may determine a classification for the posted civic issue that includes types of work, such as traffic policing and asphalt patching. In addition, civic-issues platform 300 may retrieve a location of the pothole corresponding to the junction of Mission Street and 5th Street in San Francisco from the received request (for example, from location information retrieved from location services on the user's mobile client system 130). Based at least on the determined classification and the retrieved location, civic-issues platform 300 may assign the posted civic issue to the San Francisco Public Works and the San Francisco Police Department. As another example and not by way of limitation, a user may create a post to report a particular road accident within a community on civic-issues platform 300. Furthermore, the user may post one or more images associated with the road accident to civic-issues platform 300. Thereafter, civic-issues platform 300 may retrieve information corresponding to the location of the road accident from metadata associated with the images. Based at least on the retrieved information and the determined classification of the post corresponding to the road accident, civic-issues platform 300 may assign the posted civic issue to a fire station location of the San Francisco Fire Department closest to the location of the road accident to provide immediate medical assistance to the road accident. In particular embodiments, once the posted civic-issue has been assigned to one or more agencies of the municipality, civic-issues platform 300 may store the post corresponding to the civic issue in an issue-tracking database, such as issue-tracking database 164B. Although this disclosure describes assigning particular posts corresponding to particular civic issues in a particular manner, the disclosure contemplates assigning any suitable posts corresponding to any suitable civic issues in any suitable manner.

In particular embodiments, users of social-networking system 160 may utilize civic-issues platform 300 to update and track progress in resolving a pending civic issue posted on civic-issues platform 300. The user updating or tracking the progress of the civic issue may be, for example, the user who created the post associated with the pending civic issue, a user associated with the agency assigned to resolve the pending civic issue, a third-party user, or another suitable user of the online social network. The user who created the post may utilize client system 130 to update and track the progress. In particular embodiments, the user associated with the agency may utilize public-agency system 170 coupled to civic-issues platform 300 via network 110, associated with the agency to update and track the progress. The third-party user may utilize client system 130 to update and track the progress. In particular embodiments, the third-party user may share particular connections or attributes with the user who created the post. As an example and not by way of limitation, the third-party user may live in the municipality associated with the pending civic issue or within a pre-determined threshold distance of the location associated with the pending civic issue. Accordingly, civic-issues platform 300 may enable other members of the community who are users of the online social network to register their support for the pending civic issue. Furthermore, civic-issues platform 300 may raise awareness within the community for resolving the pending civic issue. In particular embodiments, the users may utilize a dashboard of civic-issues platform 300 to update and track the pending civic issue. The dashboard may be provided by and accessible to the public-agency system associated with the agency. Although this disclosure describes updating and tracking particular civic issues in particular manners, the disclosure contemplates updating and tracking any suitable civic issues in any suitable manners.

In particular embodiments, civic-issues platform 300 may receive a request from a user of social-networking system 160 to update the post on civic-issues platform 300, where the request describes a current status of the civic issue. As an example and not by way of limitation, civic-issues platform 300 may receive a request from an employee or contractor assigned by the agency to resolve the civic issue, where the request describes that the civic issue has been resolved. The update may include a comment, a video, an image, a re-share, a like, a spam flag, another suitable update, or any combination thereof. In particular embodiments, civic-issues platform 300 may update the post in issue-tracking database 164B. As an example and not by way of limitation, referencing the repair of the pothole at the junction of Mission Street and 5th Street in San Francisco, civic-issues platform 300 may receive a request from a contractor assigned by the San Francisco Public Works to update the post on civic-issues platform 300 corresponding to the civic issue, where the request includes a comment describing the resolution of the pothole and an image illustrating the repaired pothole. Accordingly, civic-issues platform 300 may update the post in issue-tracking database 164B with the comment and the image. Civic-issues platform 300 may update the post on a dashboard accessible by a public-agency system, such as public agency system 170A, associated with the agency. In particular embodiments, in response to the update of the post, civic-issues platform 300 may send a notification indicating that the post has been updated to the client system of the user who created the post. The notification may include a reference to the current status of the civic issue. Civic-issues platform 300 may also send the notification to users who have, for example, commented on, reshared, posted updates to, or liked the original post. In particular embodiments, in response to the updating of the post, civic-issues platform 300 may receive a feedback associated with the current status of the civic issue from a third-party user associated with social-networking system 160. The feedback may include supporting (e.g., "liking," up-voting, etc.) the current status of the post on civic-issues platform 300, re-sharing the current status of the post on social-networking system 160, sending a request to update the post, posting a comment associated with the current status of the post on civic-issues platform 300, or any suitable combination thereof. As an example and not by way of limitation, a third-party user from the community associated with the civic issue may send a feedback to civic-issues platform 300 to confirm the current status of the civic issue, such as verifying the resolution of the civic issue. For example, as a user or agency indicates that a particular civic issue has been resolved, civic-issues platform 300 may notify one or more other users of the online social network (e.g., users who have previously liked the post, users who live near the location associated with the civic issue, users who have subscribed to civic issues in the area, users who have a history of engaging with civic-issues platform 300, etc.) of the update of the post associated with the civic issue. The update may also allow the other users to confirm whether the civic issue has been resolved. Civic-issues platform 300 may then store one or more of the feedback in issue-tracking database 164B. In particular embodiments, civic-issues platform 300 may send a notification to a third-party user located within a pre-determined distance of the location associated with the civic issue requesting to verify resolution of the civic issue. As an example and not by way of limitation, referencing the repair of the pothole at the junction of Mission Street and 5th Street in San Francisco, civic-issues platform 300 may send a notification to a third-party user located within a pre-determined distance (e.g., 5000 feet) of the junction of Mission Street and 5th Street requesting to verify the resolution of the pothole. Although this disclosure describes updating particular posts in a particular manner, the disclosure contemplates updating any suitable posts in any suitable particular manner.

In particular embodiments, civic-issues platform 300 may retrieve from issue-tracking database 164B one or more of the feedbacks to determine a number of distinct users of social-networking system 160 who validated a resolution of the civic issue. As an example and not by way of limitation, referencing the repair of the pothole at the junction of Mission Street and 5th Street in San Francisco, civic-issues platform 300 may retrieve from issue-tracking database 164B feedbacks from third-party users of social-networking system 160 who validated the resolution of the pothole-repair civic issue. If the number of distinct users is above pre-determined threshold entities, civic-issues platform 300 may close the civic issue. As an example and not by way of limitation, if the number of distinct third-party users who validated the resolution of the pothole is above a pre-determined threshold entities (e.g., three third-party users), civic-issues platform 300 may close the pothole-repair civic issue. In particular embodiments, civic-issues platform 300 may close the civic issue by indicating a status of the civic issue as resolved in issue-tracking database 164B. As an example and not by way of limitation, civic-issues platform 300 may close the pothole-repair civic issue by marking the pothole-repair civic issue in issue-tracking database 164B as resolved. In particular embodiments, in response to the closure of the civic issue, civic-issues platform 300 may send notifications to users of social-networking system 160 who previously subscribed to the post associated with the civic issue, where the notifications indicate that the civic issue is resolved. As an example and not by way of limitation, in response to the closure of the pothole-repair civic issue, civic-issues platform 300 may send notifications to third-party users of social-networking system 160 who previously subscribed to the post associated with the pothole-repair civic issue, where the notifications indicate that the pothole-repair civic issue is resolved. Although this disclosure describes managing posts corresponding to civic issues in a particular manner, the disclosure contemplates managing posts corresponding to civic issues in any suitable manner.

In particular embodiments, civic-issue platform 300 may calculate a performance score for each of the public agencies associated with the public-agency databases. The performance score may indicate a performance of the public agency for resolving civic issues assigned to the public agency. The performance score for each public agency may be calculated based at least on one or more parameters and their associated values. As an example and not by way of limitation, the performance score may be based on a number of civic issues being assigned to the public agency over a particular duration of time versus a number of civic issues being resolved by the public agency over the duration of time, an average duration of time spent by the public agency to resolve assigned civic issues, an average number of votes posted by third-party users on civic-issues platform 300 favorable to resolutions of civic issues assigned to the public agency, a level of feedback (e.g., likes) the public agency receives on its responses to the original post, other suitable factors, or any combination thereof. Although this disclosure describes calculating performance scores for public agencies in a particular manner, the disclosure contemplates calculating performance scores for public agencies in any suitable manner.

In particular embodiments, civic-issues platform 300 may rank one or more public agencies associated with the public-agency databases. As an example and not by way of limitation, civic-issues platform 300 may aggregate the performance scores of public agencies associated with the public-agency databases, and rank each of the public agencies based at least on the aggregate performance score. Furthermore, civic-issues platform 300 may rank public agencies within one or more geographical jurisdictions or municipalities. As such, civic-issues platform 300 may compare performance of a particular public agency within the geographical jurisdictions or municipalities against performances of other public agencies within the geographical jurisdictions or municipalities. In particular embodiments, civic-issues platform 300 may calculate a performance score for a municipality based on performance scores of one or more of its public agencies. As an example and not by way of limitation, civic-issues platform 300 may calculate a performance score for the city of San Francisco based on performances scores of its public agencies including, but not limited to, the San Francisco Public Works, the San Francisco Fire Department, and the San Francisco Police Department. Furthermore, civic-issues platform 300 may rank the city of San Francisco based on its calculated performance score versus calculated performance scores of one or more other cities (e.g., other cities in California, in the United States, or even globally). Accordingly, such ranking of the cities may encourage cities to compete against each other to resolve civic issues and improve their rankings. In particular embodiments, civic-issues platform 300 may also score/rank users based on their participation/contributions with civic-issues platform 300. The score/rank of users could then be shared with other users via a leaderboard-type page. This may be useful as a way for users to build a transparent record of public service which can be tracked and shared via the online social network. Although this disclosure describes ranking public agencies and municipalities in a particular manner, the disclosure contemplates ranking public agencies or municipalities in any suitable manner.

In particular embodiments, civic-issues platform 300 may provide monetary incentives to the public agencies for promoting civic engagements via the online social network. Social-networking system 160 may assign a user of civic-issues platform 300 to one or more user-clusters, where each user-cluster identifies a plurality of users of the online social network for target advertising or other types of content promotion on the online social network. As an example and not by way of limitation, a user-cluster may correspond to particular users sharing a common attribute (e.g., civic interests, political affiliation, etc.), particular social cluster of social-networking system 160 having particular friends-of-friends connections or social-graph affinities, particular demographics of users, or any suitable combination thereof. Social-networking system 160 may assign the user to the user-clusters based at least on an engagement of the user with civic-issues platform 300. As an example and not by way of limitation, in response to a first user posting about a pothole on a junction of Mission Street and 5th Street in San Francisco (which is in the so-called Union Square neighborhood of San Francisco) on civic-issues platform 300, social-networking system 160 may assign that user to a user-cluster associated, for example, users interested in the Union Square neighborhood of San Francisco, users interested in local politics in San Francisco, users interested in road traffic news, and/or other suitable user-clusters. Advertisements or other content could then be promoted to that user based on their assignment to one of these user-clusters. In particular embodiments, social-networking system 160 may assign a user who posted about a particular civic issue on civic-issues platform 300 to a particular user-cluster by comparing one or more of the n-grams extracted from the text of the post associated with the civic issue with one or more ad-keywords associated with the user-cluster. As an example and not by way of limitation, a user may create a post on civic-issues platform 300 to highlight a misspelled candidate's name on a paper ballot voting for the mayor of San Francisco. Furthermore, a text of the post associated with the civic issue may include n-grams such as "San Francisco", "mayor", "democratic", "Edwin", and "Ed." Thereafter, social-networking system 160 may extract a subset of the n-grams (e.g., "mayor", "democratic", and "Ed") from the text and compare the extracted n-grams with ad-keywords associated with one or more user-clusters from social-networking system 160 including, but not limited to, user-clusters associated with the Democratic Party and Mayor Ed Lee (who is mayor for the City of San Francisco) respectively. Furthermore, ad-keywords associated with the user-cluster of the Democratic Party may include "democratic" and ad-keywords associated with the user-cluster of Ed Lee may include "Ed", "mayor", and "San Francisco." Next, social-networking system 160 may assign the user to the user-clusters associated with the Democratic Party and Mayor Ed Lee based on one or more matches between the extracted n-grams (i.e., "mayor", "democratic", and "Ed") and the ad-keywords (i.e., "democratic", "Ed", "mayor", and "San Francisco") associated with the user-clusters. Although this disclosure describes assigning users to particular user-clusters in a particular manner, the disclosure contemplates assigning users to any suitable user-clusters in any suitable manner.

In particular embodiments, in response to the assignment of the user to one or more user-clusters for targeting advertising on the online social network, advertiser system 170B may generate one or more advertisements on the online social network (or possible advertisements for third-party content providers) targeting the user. Advertiser system 170B may be associated with a third-party advertiser. Furthermore, advertiser system 170B may generate the advertisements based at least on the user-clusters assigned to the user. The generated advertisements may be placed on any page of the online social network, such as a page of civic-issues platform 300, engaged by the user. As another example and not by way of limitation, in response to assigning the user to the user-cluster associated with the Democratic Party as discussed above, advertiser system 170B may generate one or more advertisement banners that raise funding for other Democratic candidates running for public offices in San Francisco in any page on the online social network engaged by the user. In particular embodiments, civic-issues platform 300 may share a subset of the advertising revenue associated with one or more of the generated advertisements with one or more public agencies associated with civic-issues platform 300. Accordingly, such sharing of the advertising revenue with the public agencies may incentivize the public agencies to promote civic engagements via civic-issues platform 300. Such sharing of the advertising revenue with the public agencies may even incentivize users of social-networking system 160 to engage in civic issues that they are concerned with as a way to raise money for the public agency they want to support. Although this disclosure describes monetizing civic engagements on particular online social network in a particular manner, the disclosure contemplates monetizing civic engagements on any suitable online social network in any suitable manner.

Figure 4:
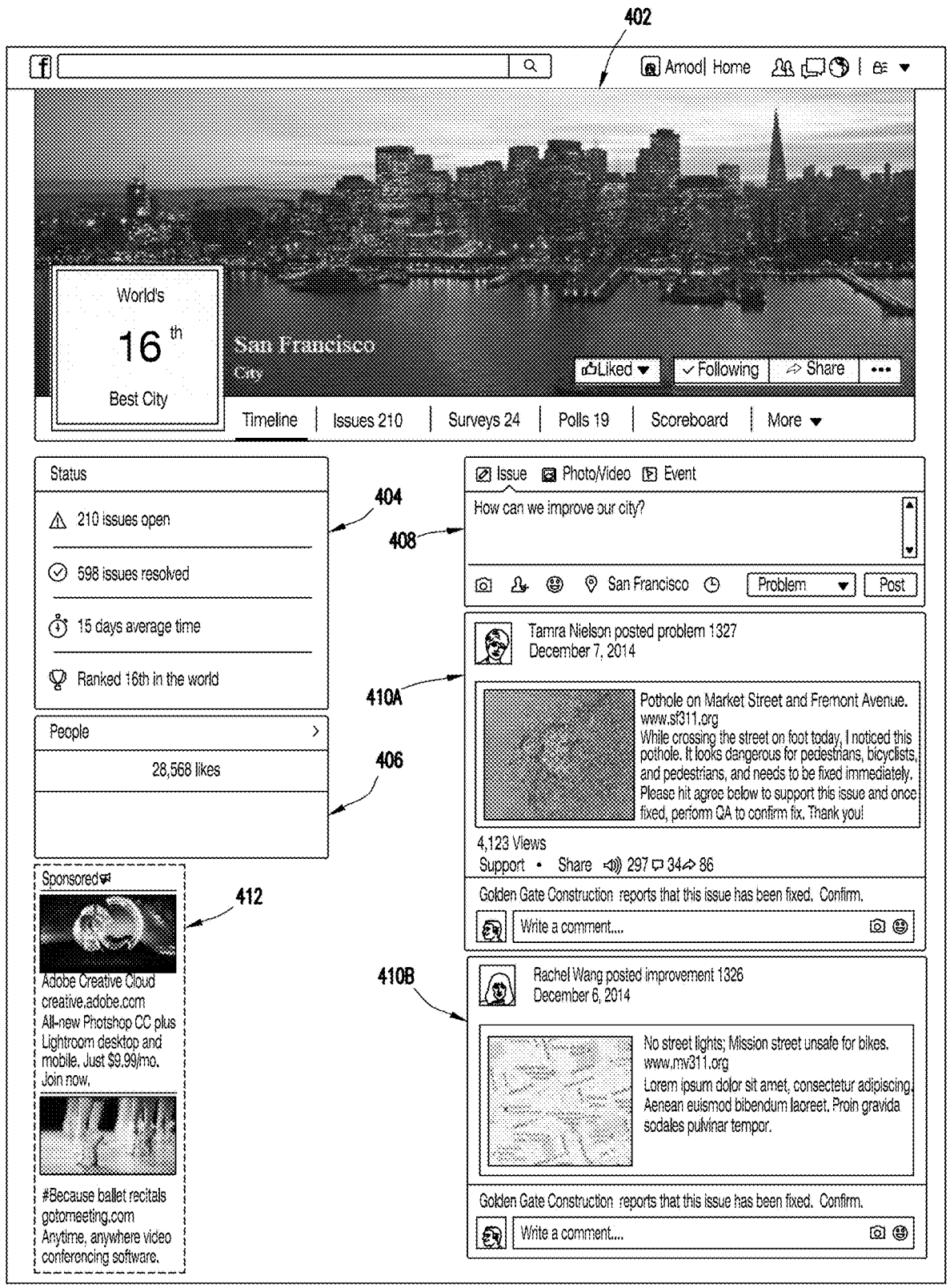
FIG. 4 illustrates an example webpage of the social-networking system associated with the civic-issues platform for an example municipality.

FIG. 4 illustrates a webpage of social-networking system 160 associated with civic-issues platform 300 for the city of San Francisco. In the example of FIG. 4, the webpage includes header-content block 402, status-content block 404, people-content block 406, input form 408, civic-issue-content blocks 410A-410B, and advertisement content block 412. The webpage may be generated after the user (i.e., Amod) has logged into social-networking system 160. In particular embodiments, header-content block 402 may include information associated with the city of San Francisco. In the example of FIG. 4, header-content block 402 indicates that San Francisco is ranked the 16th-best city in the world, the ranking being based on its calculated performance score versus calculated performance scores of all cities globally. In particular embodiments, header-content block 402 may include one or more tabs for enabling the user to navigate between webpages of the civic-issues platform 300 for the city of San Francisco. In the example of FIG. 4, header-content block 402 includes a "Timeline" tab enabling the user to navigate to the webpage illustrated by FIG. 4. In the example of FIG. 4, header-content block 402 further includes an "Issues" tab enabling the user to navigate to a webpage that includes a list of civic issues currently assigned to public agencies associated with San Francisco. The "Issues" tab illustrated in FIG. 4 also illustrates the number of civic issues ("210" issues) outstanding. In the example of FIG. 4, header-content block 402 further includes a "Surveys" tab (which shows there are 24 surveys) enabling the user to navigate to a webpage that includes a list of 24 surveys and their results previously completed by users of civic-issues platform 300 for one or more public agencies of San Francisco. Civic-issues platform 300 may calculate performance scores for one or more of the public agencies based at least on the results of the 24 surveys. In the example of FIG. 4, header-content block 402 further includes a "Polls" tab (which shows there are 19 polls) enabling the user to navigate to a webpage that includes a list of 19 polls previously completed by users of civic-issues platform 300. Each of the 19 polls may request a user, for example, to vote for a performance of public agency in resolving a civic issue previously posted by the user on civic-issues platform 300. Civic-issues platform 300 may calculate performance scores for one or more of the public agencies based at least on the results of the polls. In particular embodiments, header-content block 402 may include one or more User-interface tools provided by social-networking system 160 to promote civic-issues platform 300 to users of the online social network. In the example of FIG. 4, header-content block 402 includes User-interface tools allowing a user to like civic-issue platform 300, follow civic-issues platform 300, or re-share civic-issues platform 300 with other third-party users of social-networking system 160. In particular embodiments, status-content block 404 may include information quantifying one or more statuses of San Francisco and its civic issues. In the example of FIG. 4, status-content block 404 includes information indicating a number of pending civic issues (i.e., "210 issues open") associated with San Francisco, a number of resolved civic issues (i.e., "598 issues resolved) associated with San Francisco, an average number of days for resolving a civic issue (i.e., "15 days average time") in San Francisco, and a current ranking of San Francisco in resolving civic issues (i.e., "Ranked 16th in the world"). In particular embodiments, people-content block 406 may include information quantifying feedback from users of social-networking system 160 toward civic-issues platform 300. In the example of FIG. 4, people-content block 406 includes a number of users of social-networking system 160 (i.e., "28,568 likes") liking civic-issues platform 300 on the online social network. Although this disclosure describes and illustrates accessing a particular user interface a civic-issues platform in a particular manner, the disclosure contemplates accessing any suitable user interface (e.g., a webpage, a user interface of a native application, or a augmented/virtual reality interface) a civic-issues platform in any suitable manner.

In particular embodiments, input form 408 may allow the user to post a civic issue on civic-issues platform 300. In the example of FIG. 4, input form 408 includes a text area (i.e., text area containing "How can we improve our city?") corresponding to "issue" tab. Furthermore, the text area may allow the user to enter text describing the civic issue. In addition, input form 408 includes "Photo/Video" tab allowing the user to submit a photo or a video to illustrate the civic issue. Input form 408 also includes a select box (i.e., "Problem" select box) allowing the user to select a particular user-reported category, such as "Problem", "Hazard", or "Improvement", corresponding to the civic issue. Input form 408 also includes a button (i.e., "Post" button) allowing the user to submit the post corresponding to the civic issue to civic-issues platform 300. In particular embodiments, civic-issue-content blocks 410A-410B may describe particular pending civic issues posted by users of civic-issues platform 300 in particular chronological order. In the example of FIG. 4, civic-issue-content block 410A describes a civic issue (i.e., problem 1327) posted by Tamra Nielson on Dec. 7, 2014 associated with a pothole on Market Street and Fremont Ave. in San Francisco. In addition, civic-issue-content block 410A includes information indicating that the civic issue has been viewed 4123 times on civic-issues platform 300, commented 34 times on civic-issues platform 300, re-shared 86 times on civic-issues platform 300, and supported 297 times on civic-issues platform 300. Furthermore, civic-issue-content block 410A includes an update by a vendor (i.e., Golden Gate Construction) assigned to resolve the pothole problem indicating that the civic issue has been fixed. Based at least on the update, civic-issue-content block 410A includes a button (i.e., "Confirm" button) for users of civic-issues platform 300 to confirm whether the pothole problem is resolved and a text area (i.e., "Write a comment . . . " text area) for users of civic-issues platform 300 to post a comment responding to the update by the vendor, as discussed above. In the example of FIG. 4, civic-issue-content block 410B describes a civic issue (i.e., improvement 1326) posted by Rachel Wang on Dec. 6, 2014 associated with no street lights on Mission Street in San Francisco. In addition, civic-issue-content block 410B includes an update by a vendor (i.e., Golden Gate Construction) assigned to resolve the lights improvement indicating that the civic issue has been fixed. Based at least on the update, civic-issue-content block 410B includes a button (i.e., "Confirm" button) for users of civic-issues platform 300 to confirm whether the lights improvement is resolved and a text area (i.e., "Write a comment . . . " text area) for users of civic-issues platform 300 to post a comment responding to the update by the vendor, as discussed above. In particular embodiments, advertisement content block 412 may include one or more advertisements targeting the user (i.e. Amod) on civic-issues platform 300. In the example of FIG. 4, advertiser system 170B generates the advertisements based at least on user-clusters associated with photo-editing software and video conferencing software respectively. In particular embodiments, advertising revenue generated by the user clicking on any of the links to the advertisements may be shared with one or more public agencies of San Francisco as discussed above.

Figure 5:
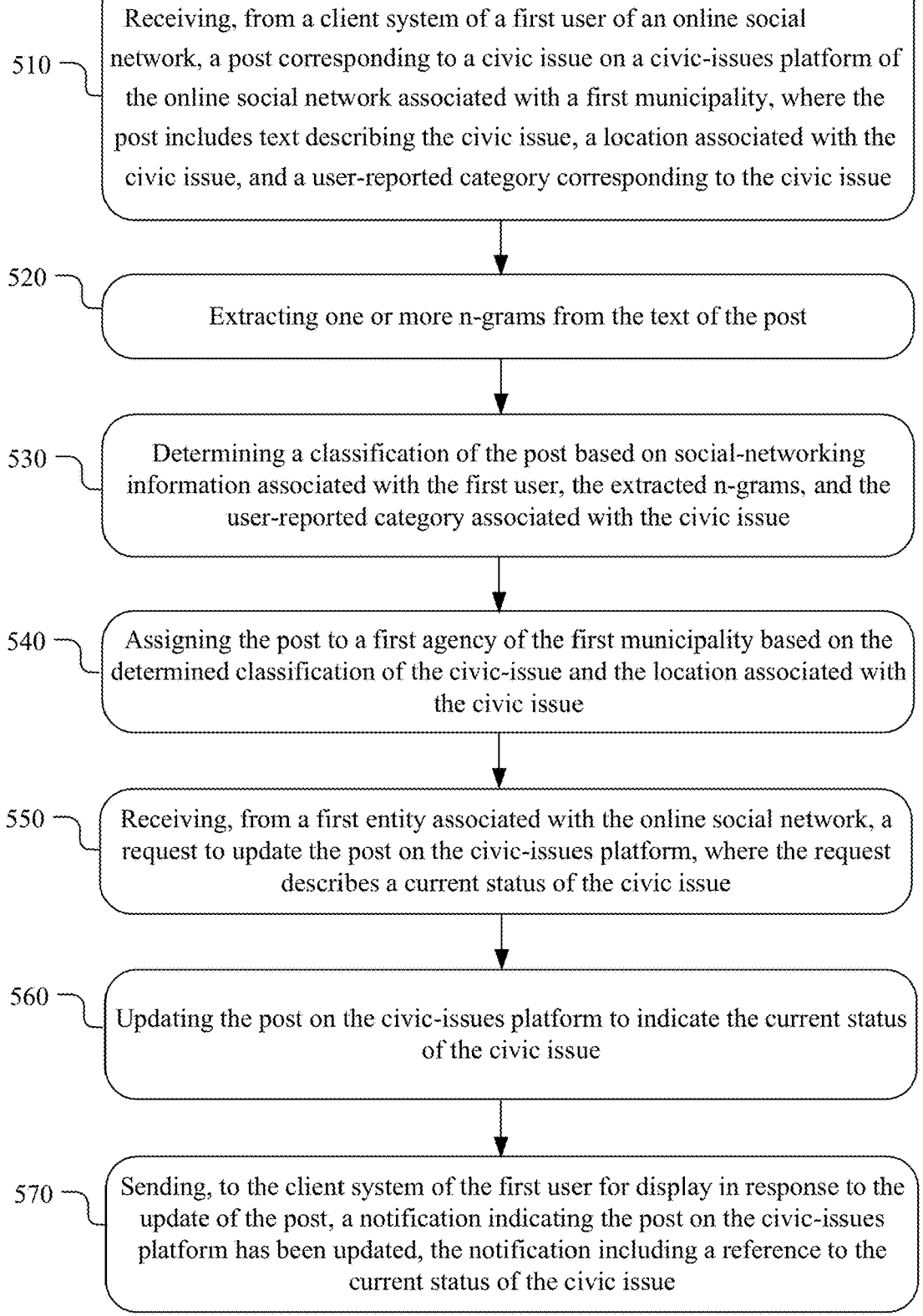
FIG. 5 illustrates an example method of civic engagement associated with the civic-issues platform.

FIG. 5 illustrates method 500 of civic engagement associated with civic-issues platform 300. The method may begin at step 510, where one or more computing devices may receive a post corresponding to a civic issue on a civic-issues platform of an online social network associated with a first municipality from a client system of a first user of an online social network. Furthermore, the post may include text describing the civic issue, a location associated with the civic issue, and a user-reported category corresponding to the civic issue. As an example and not by way of limitation, referencing FIGS. 3 and 4, server 162 may receive a post, such as information associated with input form 408 entered by user 306A (e.g., user "Tamra Nielson"), corresponding to pothole problem 1327 on Market Street and Fremont Ave. in San Francisco on civic-issues platform 300 of social-networking system 160 associated with the municipality of San Francisco from client system 130A of user 306A of social-networking system 160. Furthermore, the post may include text describing the civic issue retrieved from the text area of input form 408 (e.g., text description of the pothole problem in civic-issue-content box 410A), a location (e.g., junction of Market Street and Fremont Ave. in San Francisco) associated with the civic issue, and a user-reported category (e.g., "Problem") corresponding to the civic issue retrieved from the "Problem" select box of input form 408. At step 520, the computing devices may extract one or more n-grams from the text of the post. As an example and not by way of limitation, referencing FIGS. 3 and 4, server 162 may extract n-grams, such as "street" and "pothole", from the text of the post. At step 530, the computing devices may determine a classification of the post based on social-networking information associated with the first user, the extracted n-grams, and the user-reported category associated with the civic issue. As an example and not by way of limitation, referencing FIGS. 2, 3 and 4, server 162 may determine a classification (e.g., asphalt patching and high priority) for the post based on social graph 200 associated with user 306A, the extracted n-grams of "street" and "pothole", and the user-reported category "Problem". At step 540, the computing devices may assign the post to a first agency of the first municipality based on the determined classification of the civic-issue and the location associated with the civic issue. As an example and not by way of limitation, referencing FIG. 3, server 162 may assign the post to the San Francisco Public Works based on the determined classification (e.g., asphalt patching) of the civic-issue and the location (e.g., Mission Street and Fremont Ave. in San Francisco) associated with the civic issue.

At step 550, the computing devices may receive a request from a first entity associated with the online social network to update the post on the civic-issues platform, where the request describes a current status of the civic issue. As an example and not by way of limitation, referencing FIGS. 3 and 4, server 162 may receive a request from a contractor associated with social-networking system 160 and assigned to resolve the civic issue to update civic-issue-content block 410A on civic-issues platform 300, where the request describes that the issue is fixed. At step 560, the computing devices may update the post on the civic-issues platform to indicate the current status of the civic issue. As an example and not by way of limitation, referencing FIGS. 3 and 4, server 162 may update civic-issue-content block 410A on civic-issues platform 300 to indicate that the civic issue has been fixed. At step 570, the computing devices may send, to the client system of the first user for display in response to the update of the post, a notification indicating the post on the civic-issues platform has been updated. Furthermore, the notification may include a reference to the current status of the civic issue. As an example and not by way of limitation, referencing FIGS. 3 and 4, server 162 may send, to client system 130A of user 306A for display in response to the update of civic-issue-content block 410A, a notification indicating civic-issue-content block 410A on civic-issues platform 300 has been updated. Furthermore, the notification may include a reference indicating that the civic issue has been fixed. Although this disclosure describes and illustrates particular steps of method 500 of FIG. 5 as occurring in a particular order, this disclosure contemplates any suitable steps of method 500 of FIG. 5 occurring in any suitable order. Moreover, although this disclosure describes and illustrates an example method for civic engagement associated with civic-issues platform 300 including the particular steps of method 500 of FIG. 5, this disclosure contemplates any suitable method for civic engagement associated with any suitable civic-issues platform including any suitable steps, which may include all, some, or none of the steps of method 500 of FIG. 5, where appropriate. Furthermore, although this disclosure describes and illustrates particular components, devices, or systems carrying out particular steps of method 500 of FIG. 5, this disclosure contemplates any suitable combination of any suitable components, devices, or systems carrying out any suitable steps of method 500 of FIG. 5.

Advertising

In particular embodiments, an advertisement may be text (which may be HTML-linked), one or more images (which may be HTML-linked), one or more videos, audio, other suitable digital object files, a suitable combination of these, or any other suitable advertisement in any suitable digital format presented on one or more web pages, in one or more e-mails, or in connection with search results requested by a user. In addition or as an alternative, an advertisement may be one or more sponsored stories (e.g., a news-feed or ticker item on social-networking system 160). A sponsored story may be a social action by a user (such as "liking" a page, "liking" or commenting on a post on a page, RSVPing to an event associated with a page, voting on a question posted on a page, checking in to a place, using an application or playing a game, or "liking" or sharing a website) that an advertiser promotes, for example, by having the social action presented within a pre-determined area of a profile page of a user or other page, presented with additional information associated with the advertiser, bumped up or otherwise highlighted within news feeds or tickers of other users, or otherwise promoted. The advertiser may pay to have the social action promoted. The social action may be promoted within or on social-networking system 160. In addition or as an alternative, the social action may be promoted outside or off of social-networking system 160, where appropriate. In particular embodiments, a page may be an on-line presence (such as a webpage or website within or outside of social-networking system 160) of a business, organization, or brand facilitating its sharing of stories and connecting with people. A page may be customized, for example, by adding applications, posting stories, or hosting events.

A sponsored story may be generated from stories in users' news feeds and promoted to specific areas within displays of users' web browsers when viewing a web page associated with social-networking system 160. Sponsored stories are more likely to be viewed by users, at least in part because sponsored stories generally involve interactions or suggestions by the users' friends, fan pages, or other connections. In connection with sponsored stories, particular embodiments may utilize one or more systems, components, elements, functions, methods, operations, or steps disclosed in U.S. patent application Ser. No. 13/327,557, entitled "Sponsored Stories Unit Creation from Organic Activity Stream" and filed 15 Dec. 2011, U.S. Patent Application Publication No. 2012/0203831, entitled "Sponsored Stories Unit Creation from Organic Activity Stream" and filed 3 Feb. 2012 as U.S. patent application Ser. No. 13/020,745, or U.S. Patent Application Publication No. 2012/0233009, entitled "Endorsement Subscriptions for Sponsored Stories" and filed 9 Mar. 2011 as U.S. patent application Ser. No. 13/044,506, which are all incorporated herein by reference as an example and not by way of limitation. In particular embodiments, sponsored stories may utilize computer-vision algorithms to detect products in uploaded images or photos lacking an explicit connection to an advertiser as disclosed in U.S. patent application Ser. No. 13/212,356, entitled "Computer-Vision Content Detection for Sponsored Stories" and filed 18 Aug. 2011, which is incorporated herein by reference as an example and not by way of limitation.

As described above, an advertisement may be text (which may be HTML-linked), one or more images (which may be HTML-linked), one or more videos, audio, a suitable combination of these, or any other suitable advertisement in any suitable digital format. In particular embodiments, an advertisement may be requested for display within third-party webpages, social-networking-system webpages, or other pages. An advertisement may be displayed in a dedicated portion of a page, such as in a banner area at the top of the page, in a column at the side of the page, in a user interface of the page, in a pop-up window, over the top of content of the page, or elsewhere with respect to the page. In addition or as an alternative, an advertisement may be displayed within an application or within a game. An advertisement may be displayed within dedicated pages, requiring the user to interact with or watch the advertisement before the user may access a page, utilize an application, or play a game. The user may, for example view the advertisement through a web browser.

A user may interact with an advertisement in any suitable manner. The user may click or otherwise select the advertisement, and the advertisement may direct the user (or a browser or other application being used by the user) to a page associated with the advertisement. At the page associated with the advertisement, the user may take additional actions, such as purchasing a product or service associated with the advertisement, receiving information associated with the advertisement, or subscribing to a newsletter associated with the advertisement. An advertisement with audio or video may be played by selecting a component of the advertisement (like a "play button"). In particular embodiments, an advertisement may include one or more games, which a user or other application may play in connection with the advertisement. An advertisement may include functionality for responding to a poll or question in the advertisement.

An advertisement may include social-networking-system functionality that a user may interact with. For example, an advertisement may enable a user to "like" or otherwise endorse the advertisement by selecting an icon or link associated with endorsement. Similarly, a user may share the advertisement with another user (e.g., through social-networking system 160) or RSVP (e.g., through social-networking system 160) to an event associated with the advertisement. In addition or as an alternative, an advertisement may include social-networking-system content directed to the user. For example, an advertisement may display information about a friend of the user within social-networking system 160 who has taken an action associated with the subject matter of the advertisement.

Social-networking-system functionality or content may be associated with an advertisement in any suitable manner. For example, an advertising system (which may include hardware, software, or both for receiving bids for advertisements and selecting advertisements in response) may retrieve social-networking functionality or content from social-networking system 160 and incorporate the retrieved social-networking functionality or content into the advertisement before serving the advertisement to a user. Examples of selecting and providing social-networking-system functionality or content with an advertisement are disclosed in U.S. Patent Application Publication No. 2012/0084160, entitled "Providing Social Endorsements with Online Advertising" and filed 5 Oct. 2010 as U.S. patent application Ser. No. 12/898,662, and in U.S. Patent Application Publication No. 2012/0232998, entitled "Selecting Social Endorsement Information for an Advertisement for Display to a Viewing User" and filed 8 Mar. 2011 as U.S. patent application Ser. No. 13/043,424, which are both incorporated herein by reference as examples only and not by way of limitation. Interacting with an advertisement that is associated with social-networking-system functionality or content may cause information about the interaction to be displayed in a profile page of the user in social-networking-system 160.

Particular embodiments may facilitate the delivery of advertisements to users that are more likely to find the advertisements more relevant or useful. For example, an advertiser may realize higher conversion rates (and therefore higher return on investment (ROI) from advertising) by identifying and targeting users that are more likely to find its advertisements more relevant or useful. The advertiser may use user-profile information in social-networking system 160 to identify those users. In addition or as an alternative, social-networking system 160 may use user-profile information in social-networking system 160 to identify those users for the advertiser. As examples and not by way of limitation, particular embodiments may target users with the following: invitations or suggestions of events; suggestions regarding coupons, deals, or wish-list items; suggestions regarding friends' life events; suggestions regarding groups; advertisements; or social advertisements. Such targeting may occur, where appropriate, on or within social-networking system 160, off or outside of social-networking system 160, or on mobile computing devices of users. When on or within social-networking system 160, such targeting may be directed to users' news feeds, search results, e-mail or other in-boxes, or notifications channels or may appear in particular area of web pages of social-networking system 160, such as a right-hand side of a web page in a concierge or grouper area (which may group along a right-hand rail advertisements associated with the same concept, node, or object) or a network-ego area (which may be based on what a user is viewing on the web page and a current news feed of the user). When off or outside of social-networking system 160, such targeting may be provided through a third-party website, e.g., involving an ad exchange or a social plug-in. When on a mobile computing device of a user, such targeting may be provided through push notifications to the mobile computing device.

Targeting criteria used to identify and target users may include explicit, stated user interests on social-networking system 160 or explicit connections of a user to a node, object, entity, brand, or page on social-networking system 160. In addition or as an alternative, such targeting criteria may include implicit or inferred user interests or connections (which may include analyzing a user's history, demographic, social or other activities, friends' social or other activities, subscriptions, or any of the preceding of other users similar to the user (based, e.g., on shared interests, connections, or events)). Particular embodiments may utilize platform targeting, which may involve platform and "like" impression data; contextual signals (e.g., "Who is viewing now or has viewed recently the page for a popular soft drink brand?"); light-weight connections (e.g., "check-ins"); connection lookalikes; fans; extracted keywords; EMU advertising; inferential advertising; coefficients, affinities, or other social-graph information; friends-of-friends connections; pinning or boosting; deals; polls; household income, social clusters or groups; products detected in images or other media; social- or open-graph edge types; geo-prediction; views of profile or pages; status updates or other user posts (analysis of which may involve natural-language processing or keyword extraction); events information; or collaborative filtering. Identifying and targeting users may also include privacy settings (such as user opt-outs), data hashing, or data anonymization, as appropriate.

To target users with advertisements, particular embodiments may utilize one or more systems, components, elements, functions, methods, operations, or steps disclosed in the following, which are all incorporated herein by reference as examples and not by way of limitation: U.S. Patent Application Publication No. 2009/0119167, entitled "Social Advertisements and Other Informational Messages on a Social Networking Website and Advertising Model for Same" and filed 18 Aug. 2008 as U.S. patent application Ser. No. 12/193,702; U.S. Patent Application Publication No. 2009/0070219, entitled "Targeting Advertisements in a Social Network" and filed 20 Aug. 2008 as U.S. patent application Ser. No. 12/195,321; U.S. Patent Application Publication No. 2012/0158501, entitled "Targeting Social Advertising to Friends of Users Who Have Interacted With an Object Associated with the Advertising" and filed 15 Dec. 2010 as U.S. patent application Ser. No. 12/968,786; or U.S. Patent Application Publication No. 2012/0166532, entitled "Contextually Relevant Affinity Prediction in a Social-Networking System" and filed 23 Dec. 2010 as U.S. patent application Ser. No. 12/978,265.

An advertisement may be presented or otherwise delivered using plug-ins for web browsers or other applications, iframe elements, news feeds, tickers, notifications (which may include, for example, e-mail, Short Message Service (SMS) messages, or notifications), or other means. An advertisement may be presented or otherwise delivered to a user on a mobile or other computing device of the user. In connection with delivering advertisements, particular embodiments may utilize one or more systems, components, elements, functions, methods, operations, or steps disclosed in the following, which are all incorporated herein by reference as examples and not by way of limitation: U.S. Patent Application Publication No. 2012/0159635, entitled "Comment Plug-In for Third-Party System" and filed 15 Dec. 2010, as U.S. patent application Ser. No. 12/969,368; U.S. Patent Application Publication No. 2012/0158753, entitled "Comment Ordering System" and filed 15 Dec. 2010 as U.S. patent application Ser. No. 12/969,408; U.S. Pat. No. 7,669,123, entitled "Dynamically Providing a News Feed About a User of a Social Network" and filed 11 Aug. 2006 as U.S. patent application Ser. No. 11/503,242; U.S. Pat. No. 8,402,094, entitled "Providing a Newsfeed Based on User Affinity for Entities and Monitored Actions in a Social Network Environment" and filed 11 Aug. 2006 as U.S. patent application Ser. No. 11/503,093; U.S. Patent Application Publication No. 2012/0072428, entitled "Action Clustering for News Feeds" and filed 16 Sep. 2010 as U.S. patent application Ser. No. 12/884,010; U.S. Patent Application Publication No. 2011/0004692, entitled "Gathering Information about Connections in a Social Networking Service" and filed 1 Jul. 2009 as U.S. patent application Ser. No. 12/496,606; U.S. Patent Application Publication No. 2008/0065701, entitled "Method and System for Tracking Changes to User Content in an Online Social Network" and filed 12 Sep. 2006 as U.S. patent application Ser. No. 11/531,154; U.S. Patent Application Publication No. 2008/0065604, entitled "Feeding Updates to Landing Pages of Users of an Online Social Network from External Sources" and filed 17 Jan. 2007 as U.S. patent application Ser. No. 11/624,088; U.S. Pat. No. 8,244,848, entitled "Integrated Social-Network Environment" and filed 19 Apr. 2010 as U.S. patent application Ser. No. 12/763,171; U.S. Patent Application Publication No. 2011/0083101, entitled "Sharing of Location-Based Content Item in Social-Networking Service" and filed 6 Oct. 2009 as U.S. patent application Ser. No. 12/574,614; U.S. Pat. No. 8,150,844, entitled "Location Ranking Using Social-Graph Information" and filed 18 Aug. 2010 as U.S. patent application Ser. No. 12/858,718; U.S. patent application Ser. No. 13/051,286, entitled "Sending Notifications to Users Based on Users' Notification Tolerance Levels" and filed 18 Mar. 2011; U.S. patent application Ser. No. 13/096,184, entitled "Managing Notifications Pushed to User Devices" and filed 28 Apr. 2011; U.S. patent application Ser. No. 13/276,248, entitled "Platform-Specific Notification Delivery Channel" and filed 18 Oct. 2011; or U.S. Patent Application Publication No. 2012/0197709, entitled "Mobile Advertisement with Social Component for Geo-Social Networking System" and filed 1 Feb. 2011 as U.S. patent application Ser. No. 13/019,061. Although this disclosure describes or illustrates particular advertisements being delivered in particular ways and in connection with particular content, this disclosure contemplates any suitable advertisements delivered in any suitable ways and in connection with any suitable content.

System and Methods

Figure 6:
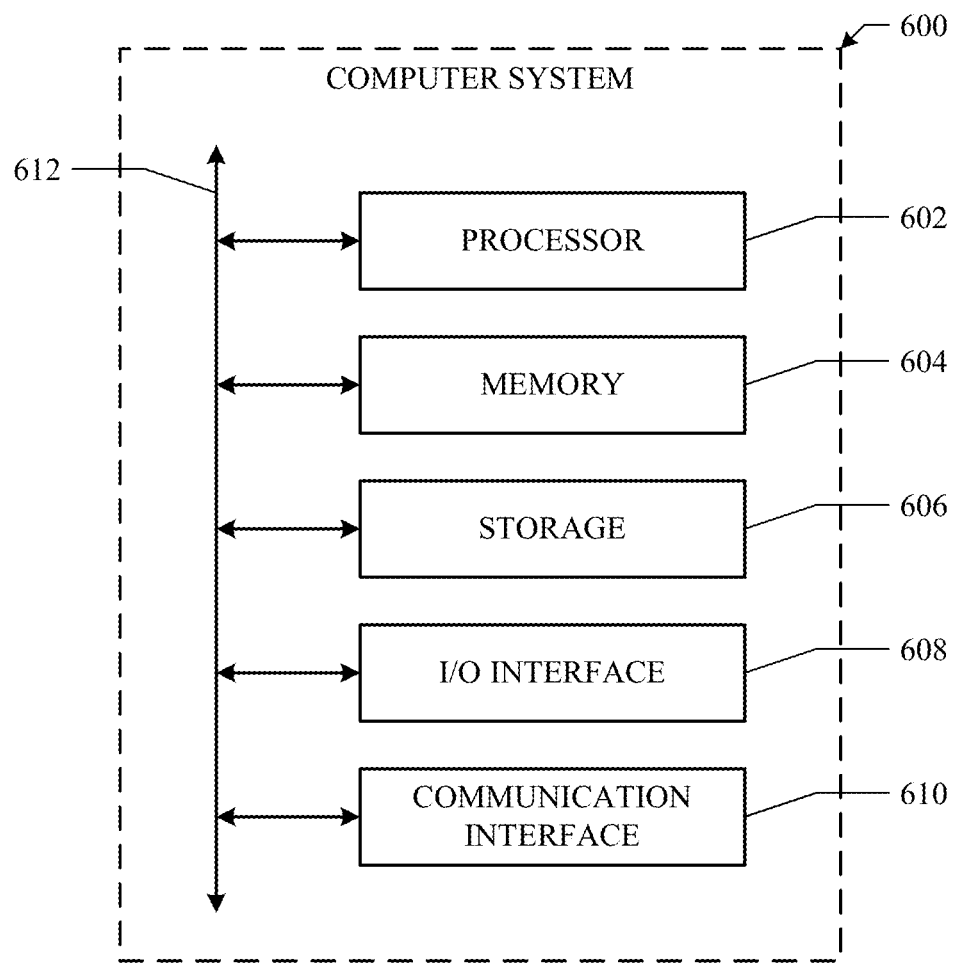
FIG. 6 illustrates an example computer system.

FIG. 6 illustrates an example computer system 600. In particular embodiments, one or more computer systems 600 perform one or more steps of one or more methods described or illustrated herein. In particular embodiments, one or more computer systems 600 provide functionality described or illustrated herein. In particular embodiments, software running on one or more computer systems 600 performs one or more steps of one or more methods described or illustrated herein or provides functionality described or illustrated herein. Particular embodiments include one or more portions of one or more computer systems 600. Herein, reference to a computer system may encompass a computing device, and vice versa, where appropriate. Moreover, reference to a computer system may encompass one or more computer systems, where appropriate.

This disclosure contemplates any suitable number of computer systems 600. This disclosure contemplates computer system 600 taking any suitable physical form. As example and not by way of limitation, computer system 600 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, an augmented/virtual reality device, or a combination of two or more of these. Where appropriate, computer system 600 may include one or more computer systems 600; be unitary or distributed; span multiple locations; span multiple machines; span multiple data centers; or reside in a cloud, which may include one or more cloud components in one or more networks. Where appropriate, one or more computer systems 600 may perform without substantial spatial or temporal limitation one or more steps of one or more methods described or illustrated herein. As an example and not by way of limitation, one or more computer systems 600 may perform in real time or in batch mode one or more steps of one or more methods described or illustrated herein. One or more computer systems 600 may perform at different times or at different locations one or more steps of one or more methods described or illustrated herein, where appropriate.

In particular embodiments, computer system 600 includes a processor 602, memory 604, storage 606, an input/output (I/O) interface 608, a communication interface 610, and a bus 612. Although this disclosure describes and illustrates a particular computer system having a particular number of particular components in a particular arrangement, this disclosure contemplates any suitable computer system having any suitable number of any suitable components in any suitable arrangement.

In particular embodiments, processor 602 includes hardware for executing instructions, such as those making up a computer program. As an example and not by way of limitation, to execute instructions, processor 602 may retrieve (or fetch) the instructions from an internal register, an internal cache, memory 604, or storage 606; decode and execute them; and then write one or more results to an internal register, an internal cache, memory 604, or storage 606. In particular embodiments, processor 602 may include one or more internal caches for data, instructions, or addresses. This disclosure contemplates processor 602 including any suitable number of any suitable internal caches, where appropriate. As an example and not by way of limitation, processor 602 may include one or more instruction caches, one or more data caches, and one or more translation lookaside buffers (TLBs). Instructions in the instruction caches may be copies of instructions in memory 604 or storage 606, and the instruction caches may speed up retrieval of those instructions by processor 602. Data in the data caches may be copies of data in memory 604 or storage 606 for instructions executing at processor 602 to operate on; the results of previous instructions executed at processor 602 for access by subsequent instructions executing at processor 602 or for writing to memory 604 or storage 606; or other suitable data. The data caches may speed up read or write operations by processor 602. The TLBs may speed up virtual-address translation for processor 602. In particular embodiments, processor 602 may include one or more internal registers for data, instructions, or addresses. This disclosure contemplates processor 602 including any suitable number of any suitable internal registers, where appropriate. Where appropriate, processor 602 may include one or more arithmetic logic units (ALUs); be a multi-core processor; or include one or more processors 602. Although this disclosure describes and illustrates a particular processor, this disclosure contemplates any suitable processor.

In particular embodiments, memory 604 includes main memory for storing instructions for processor 602 to execute or data for processor 602 to operate on. As an example and not by way of limitation, computer system 600 may load instructions from storage 606 or another source (such as, for example, another computer system 600) to memory 604. Processor 602 may then load the instructions from memory 604 to an internal register or internal cache. To execute the instructions, processor 602 may retrieve the instructions from the internal register or internal cache and decode them. During or after execution of the instructions, processor 602 may write one or more results (which may be intermediate or final results) to the internal register or internal cache. Processor 602 may then write one or more of those results to memory 604. In particular embodiments, processor 602 executes only instructions in one or more internal registers or internal caches or in memory 604 (as opposed to storage 606 or elsewhere) and operates only on data in one or more internal registers or internal caches or in memory 604 (as opposed to storage 606 or elsewhere). One or more memory buses (which may each include an address bus and a data bus) may couple processor 602 to memory 604. Bus 612 may include one or more memory buses, as described below. In particular embodiments, one or more memory management units (MMUs) reside between processor 602 and memory 604 and facilitate accesses to memory 604 requested by processor 602. In particular embodiments, memory 604 includes random access memory (RAM). This RAM may be volatile memory, where appropriate Where appropriate, this RAM may be dynamic RAM (DRAM) or static RAM (SRAM). Moreover, where appropriate, this RAM may be single-ported or multi-ported RAM. This disclosure contemplates any suitable RAM. Memory 604 may include one or more memories 604, where appropriate. Although this disclosure describes and illustrates particular memory, this disclosure contemplates any suitable memory.

In particular embodiments, storage 606 includes mass storage for data or instructions. As an example and not by way of limitation, storage 606 may include a hard disk drive (HDD), a floppy disk drive, flash memory, an optical disc, a magneto-optical disc, magnetic tape, or a Universal Serial Bus (USB) drive or a combination of two or more of these. Storage 606 may include removable or non-removable (or fixed) media, where appropriate. Storage 606 may be internal or external to computer system 600, where appropriate. In particular embodiments, storage 606 is non-volatile, solid-state memory. In particular embodiments, storage 606 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 606 taking any suitable physical form. Storage 606 may include one or more storage control units facilitating communication between processor 602 and storage 606, where appropriate. Where appropriate, storage 606 may include one or more storages 606. Although this disclosure describes and illustrates particular storage, this disclosure contemplates any suitable storage.

In particular embodiments, I/O interface 608 includes hardware, software, or both, providing one or more interfaces for communication between computer system 600 and one or more I/O devices. Computer system 600 may include one or more of these I/O devices, where appropriate. One or more of these I/O devices may enable communication between a person and computer system 600. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 608 for them. Where appropriate, I/O interface 608 may include one or more device or software drivers enabling processor 602 to drive one or more of these I/O devices. I/O interface 608 may include one or more I/O interfaces 608, where appropriate. Although this disclosure describes and illustrates a particular I/O interface, this disclosure contemplates any suitable I/O interface.

In particular embodiments, communication interface 610 includes hardware, software, or both providing one or more interfaces for communication (such as, for example, packet-based communication) between computer system 600 and one or more other computer systems 600 or one or more networks. As an example and not by way of limitation, communication interface 610 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 610 for it. As an example and not by way of limitation, computer system 600 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 600 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 600 may include any suitable communication interface 610 for any of these networks, where appropriate. Communication interface 610 may include one or more communication interfaces 610, where appropriate. Although this disclosure describes and illustrates a particular communication interface, this disclosure contemplates any suitable communication interface.

In particular embodiments, bus 612 includes hardware, software, or both coupling components of computer system 600 to each other. As an example and not by way of limitation, bus 612 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 612 may include one or more buses 612, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Miscellaneous

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

What is claimed is:

1. A method comprising, by one or more computing devices:
    receiving, from a client system of a first user of an online social network, a post corresponding to a civic issue on a civic-issues platform of the online social network associated with a first municipality, wherein the post comprises a user-generated text component describing the civic issue;
    parsing the user-generated text component of the post describing the civic issue to extract one or more n-grams from the user-generated text component of the post;
    comparing the extracted one or more n-grams with a plurality of sets of classification-keywords stored in a public-agency database, each set of classification-keywords linked to a respective agency of a plurality of agencies of the first municipality and being indicative of one or more types of work performed by the respective agency, to determine a classification of the post;
    assigning the post to a first agency of the plurality of agencies of the first municipality based on the determined classification of the post and a location associated with the civic issue;
    receiving a request to update the post on the civic-issues platform, the request describing a current status of the civic issue, wherein the request is from an entity associated with the first municipality; and
    updating the post on the civic-issues platform to indicate the current status of the civic issue.

2. The method of claim 1, wherein the entity comprises:
    the first user of the online social network;
    a second user of the online social network; or
    the first agency.

3. The method of claim 2, wherein the second user lives in the first municipality or is within a threshold distance of the location associated with the civic issue.

4. The method of claim 1, further comprising:
    authenticating the first user on the online social network, the authentication occurring prior to receiving the post from the client system of the first user.

5. The method of claim 1, wherein the civic issue is associated with an infrastructure maintenance issue within the first municipality.

6. The method of claim 1, wherein the classification of the post comprises a type or scope of work for resolving the civic issue.

7. The method of claim 1, wherein the civic-issues platform comprises one or more public-agency databases, each public-agency database being associated with a particular agency of the first municipality, wherein each public-agency database stores information associated with one or more civic issues associated with the particular agency.

8. The method of claim 7, wherein the classification-keywords are associated with the particular agency of the public-agency database.

9. The method of claim 7, wherein assigning the post to the first agency based on the location associated with the civic issue comprises comparing the location with information associated with the civic issues stored in each of the public-agency databases.

10. The method of claim 7, further comprising:
    calculating a performance score for each of the agencies associated with the public-agency databases, the performance score indicating a performance of the agency for resolving civic issues assigned to the agency; and
    ranking one or more of the agencies based on the performance scores of the agencies.

11. The method of claim 1, wherein the civic-issues platform comprises an issue-tracking database comprising information associated with one or more posts corresponding to one or more civic issues, respectively, that are still pending with the civic-issues platform.

12. The method of claim 11, further comprising:
    retrieving, from the issue-tracking database, one or more feedbacks associated with current statuses of the civic issue;
    determining, based at least on the retrieved feedbacks, a number of distinct entities associated with the online social network who validated a resolution of the civic issue; and
    indicating, if the number of distinct entities is above a pre-determined threshold entities, a status of the civic issue as resolved in the issue-tracking database.

13. The method of claim 1, further comprising:
assigning the first user to one or more user-clusters based on the post, each user-cluster identifying a plurality of users for targeted advertising on the online social network; and
generating, by an advertiser system associated with a third-party advertiser, one or more advertisements for the first user on the online social network based at least on the determined one or more user-clusters assigned to the first user.

14. The method of claim 13, wherein assigning the first user to the one or more user-clusters comprises comparing extracted n-grams of the post with one or more ad-keywords associated with the user-clusters.

15. The method of claim 1, wherein the post is updated on a dashboard of the civic-issues platform, the dashboard being accessible by a public-agency system associated with the first agency.

16. The method of claim 1, further comprising:
receiving, from a second entity associated with the online social network in response to the updating of the post, feedback associated with the current status of the civic issue.

17. The method of claim 1, wherein the received request to update the post comprises one or more of:
a comment;
a video;
an image;
a reshare;
a like; or
a spam flag.

18. The method of claim 1,
wherein the post further comprises one or more of:
the location associated with the civic issue; or
a user-reported category corresponding to the civic issue.

19. One or more computer-readable non-transitory storage media embodying software that is operable when executed to:
receive, from a client system of a first user of an online social network, a post corresponding to a civic issue on a civic-issues platform of the online social network associated with a first municipality, wherein the post comprises a user-generated text component describing the civic issue;
parse the user-generated text component of the post describing the civic issue to extract one or more n-grams from the user-generated text component of the post;
compare the extracted one or more n-grams with a plurality of sets of classification-keywords stored in a public-agency database, each set of classification-keywords linked to a respective agency of a plurality of agencies of the first municipality and being indicative of one or more types of work performed by the respective agency, to determine a classification of the post;
assign the post to a first agency of the plurality of agencies of the first municipality based on the determined classification of the post and a location associated with the civic issue;
receive a request to update the post on the civic-issues platform, the request describing a current status of the civic issue, wherein the request is from an entity associated with the first municipality; and
update the post on the civic-issues platform to indicate the current status of the civic issue.

20. A system comprising: one or more processors; and a memory coupled to the processors comprising instructions executable by the processors, the processors operable when executing the instructions to:
receive, from a client system of a first user of an online social network, a post corresponding to a civic issue on a civic-issues platform of the online social network associated with a first municipality, wherein the post comprises a user-generated text component describing the civic issue;
parse the user-generated text component of the post describing the civic issue to extract one or more n-grams from the user-generated text component of the post;
compare the extracted one or more n-grams with a plurality of sets of classification-keywords stored in a public-agency database, each set of classification-keywords linked to a respective agency of a plurality of agencies of the first municipality and being indicative of one or more types of work performed by the respective agency, to determine a classification of the post;
assign the post to a first agency of the plurality of agencies of the first municipality based on the determined classification of the post and a location associated with the civic issue;
receive a request to update the post on the civic-issues platform, the request describing a current status of the civic issue, wherein the request is from an entity associated with the first municipality; and
update the post on the civic-issues platform to indicate the current status of the civic issue.

* * * * *